United States Patent [19]

Thomas et al.

[11] 4,103,847
[45] Aug. 1, 1978

[54] LINE SCAN AREA SIGNATURE DETECTION METHOD

[75] Inventors: Frank J. Thomas; Max W. Farrow, both of Orlando, Fla.

[73] Assignee: Martin Marietta Corporation, Orlando, Fla.

[21] Appl. No.: 656,683

[22] Filed: Feb. 9, 1976

Related U.S. Application Data

[60] Division of Ser. No. 437,406, Jan. 28, 1974, Pat. No. 3,974,328, which is a continuation-in-part of Ser. No. 165,597, Jul. 23, 1971, abandoned.

[51] Int. Cl.$^2$ .................... F42B 15/02; F41G 9/00; F41G 7/00; F42B 15/10
[52] U.S. Cl. ................................. 244/3.18; 244/3.16
[58] Field of Search ................. 244/3.16, 3.17, 3.18

[56] References Cited

U.S. PATENT DOCUMENTS

| | | | |
|---|---|---|---|
| 3,372,890 | 3/1968 | Bogard et al. | 244/3.17 |
| 3,416,752 | 12/1968 | Hembree | 244/3.17 |
| 3,421,716 | 1/1969 | Altekrose et al. | 244/3.17 |
| 3,712,563 | 1/1973 | Alpers | 244/3.17 |

*Primary Examiner*—Verlin R. Pendegrass
*Assistant Examiner*—Thomas H. Webb

*Attorney, Agent, or Firm*—Julian C. Renfro; Gay Chin; James B. Eisel

[57] ABSTRACT

An area signature detection system arranged to receive an output from a sensor operative in the electromagnetic spectrum, where the output from the sensor is an amplitude varying electrical signal representing the field-of-view beheld by the sensor, and to utilize this high frequency information in such a manner that low frequency scene content, necessary for area correlation processing, can be extracted and effectively utilized. Our invention involves certain highly advantageous techniques for generating area signatures from line scan sensors, and may be applied to cartesian, circular or polar scan formats. In one particular embodiment of our invention, we describe how orthogonally disposed area signatures can be used to generate area correlation tracking signals that can be used in the derivation of appropriate missile guidance commands. Our teachings are also useful in providing line-of-sight stablization for fire control systems, alignment and position errors for landing and hovering control systems, as well as intrusion detecting systems. In the case of a system using a television camera as the sensor, this invention provides a way of obtaining an operator display and system control signals despite the fact that only a single such sensor is used.

14 Claims, 22 Drawing Figures

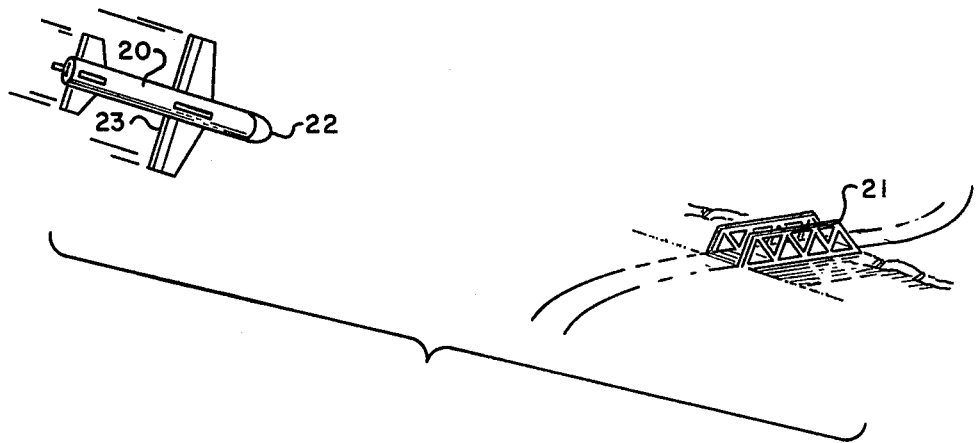
FIG. 2
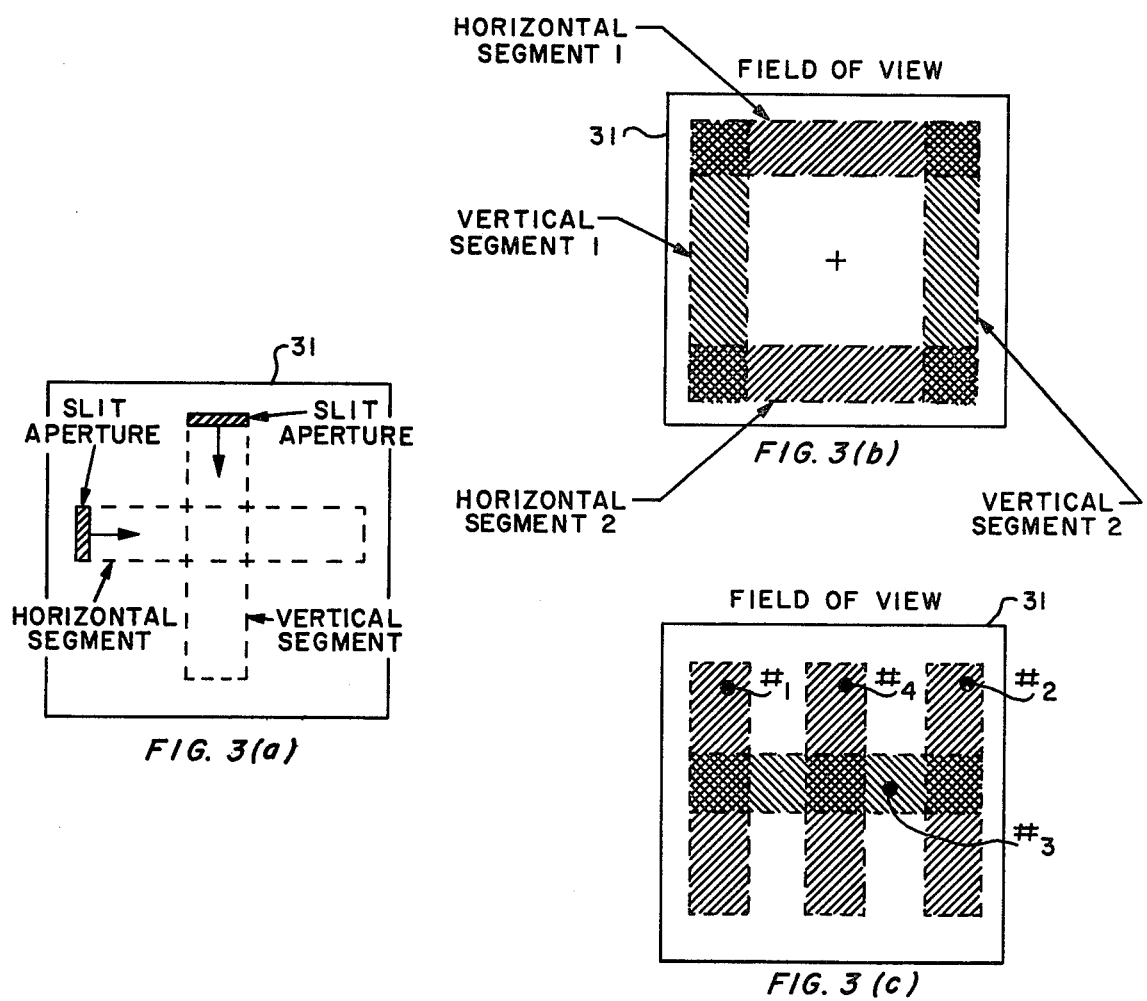
FIG. 3(a)
FIG. 3(b)
FIG. 3(c)

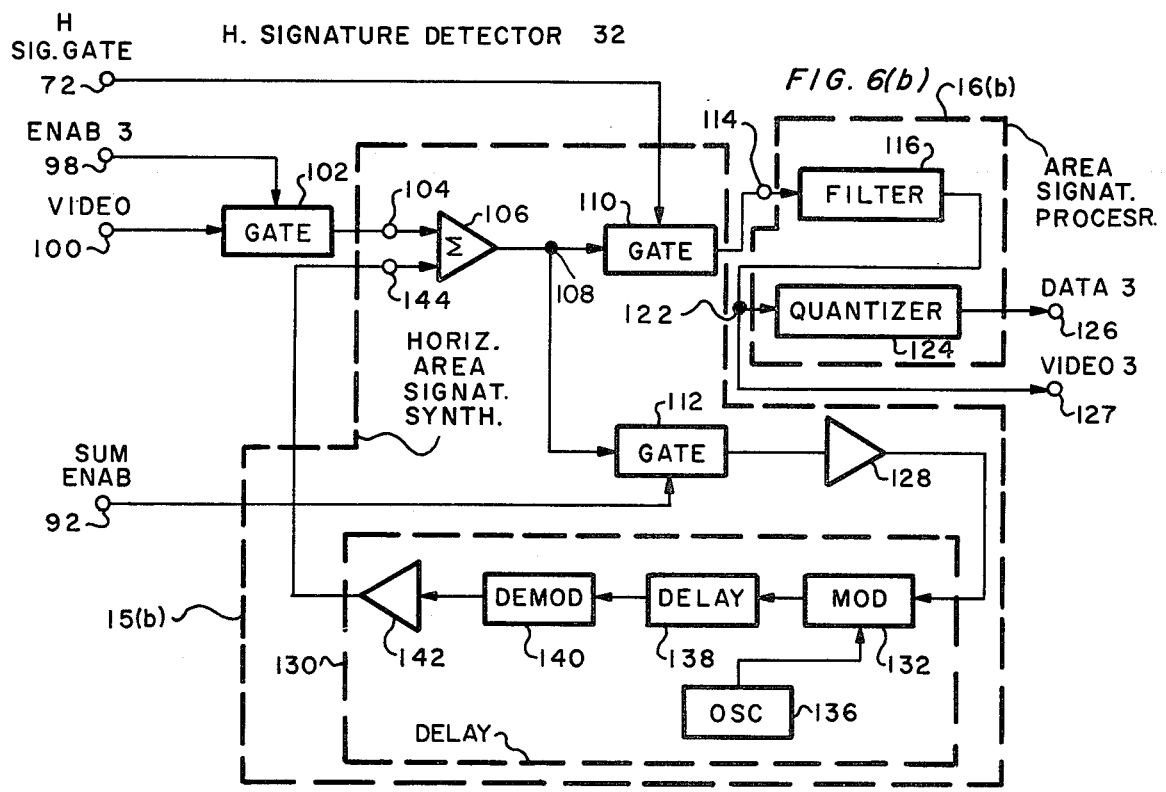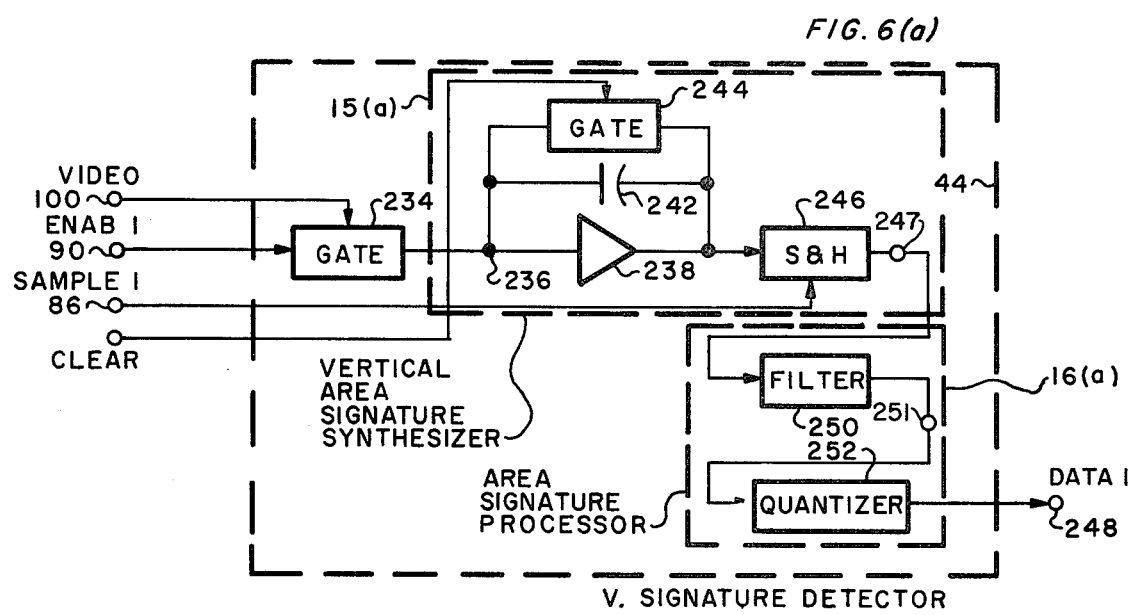

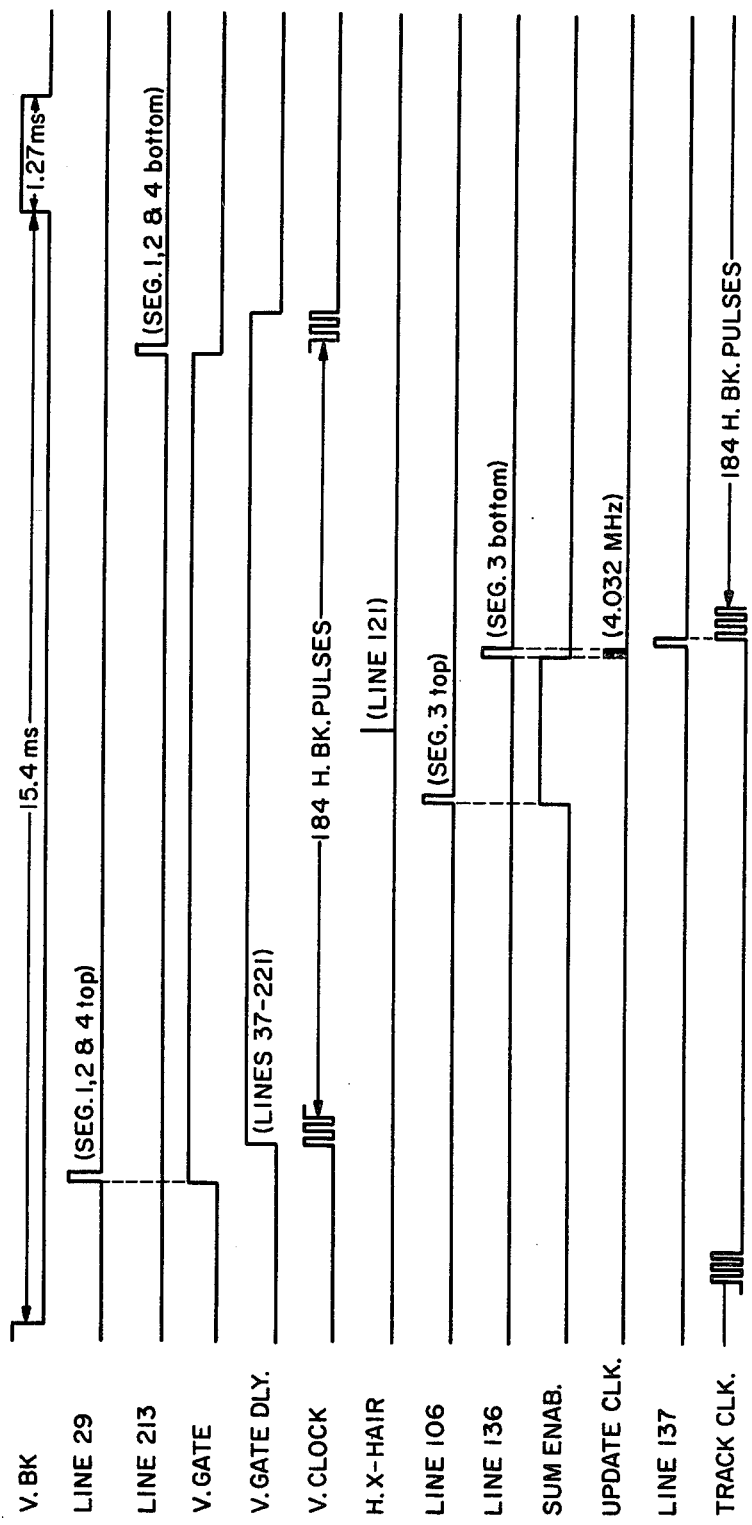
FIG 9 (a) VERTICAL TIMING

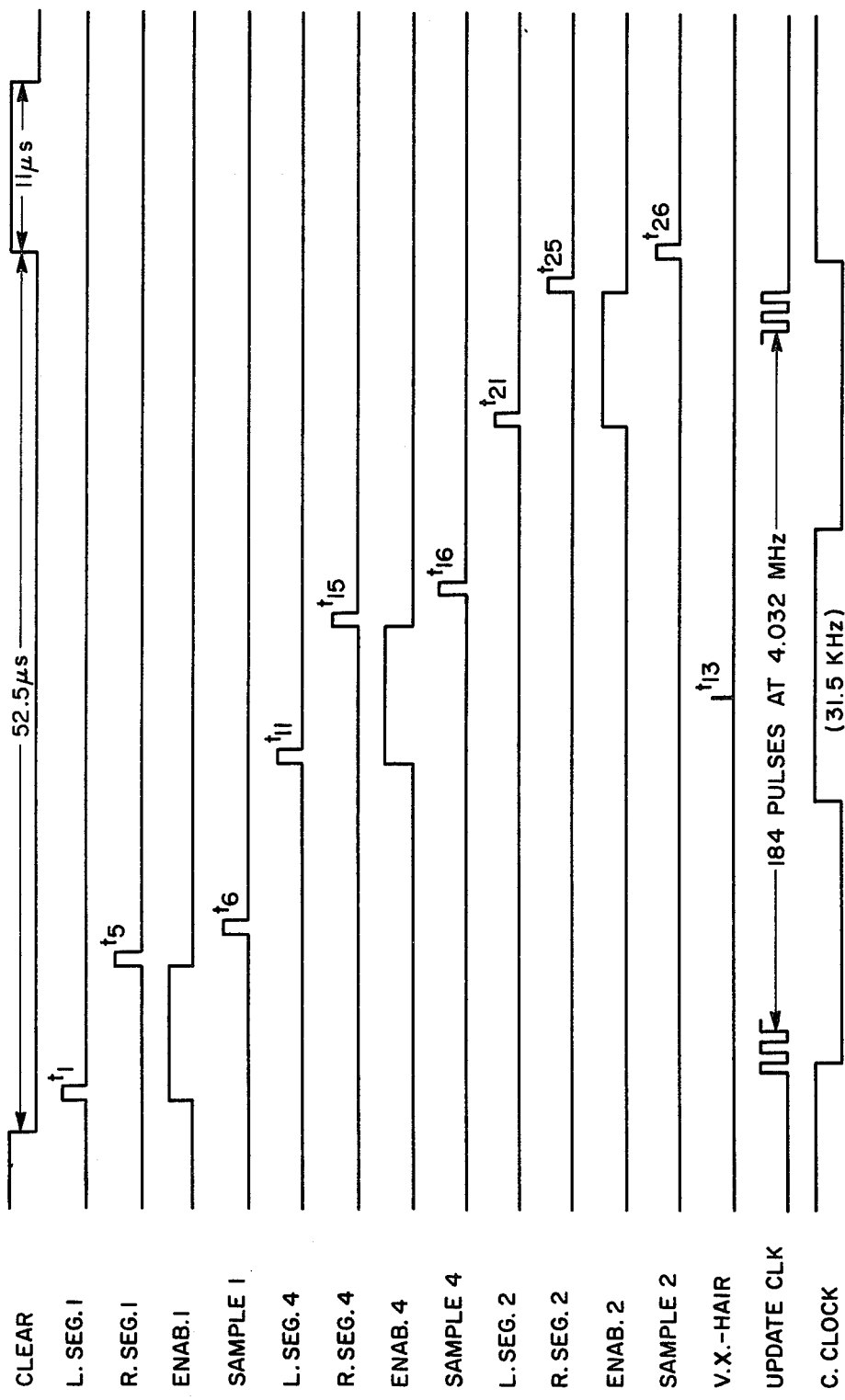
FIG. 9 (b) HORIZONTAL TIMING

LINE SCAN AREA SIGNATURE DETECTION METHOD

RELATIONSHIP TO EARLIER INVENTION

This is a Division of application Ser. No. 437,406, filed Jan. 28, 1974, which matured into U.S. Pat. No. 3,974,328 on Aug. 10, 1976 which is a Continuation-in-Part of our copending application entitled "Area Signature Detection System", filed July 23, 1971, Ser. No. 165,597, now abandoned.

BACKGROUND OF THE INVENTION

The function of an automatic electro-optical tracker is to measure the alignment error between the line-of-sight to a target and the optical system pointing vector. To achieve this, an area correlation tracker consists of at least two functional subsystems: an area signature detector, and an error processor. The function of the area signature detector is to process the video derived from the tracking sensor, which can either be an imaging sensor, such as a vidicon, or a non-imaging sensor, such as a photomultiplier tube, so as to enhance the characteristics that are required for tracking. The function of the error processor is to compare the location of the target, as defined by the video, with some reference and to extract an estimate of the misalignment between the target line-of-sight and the optical system pointing vector.

Area trackers synthesize area signatures, characteristic of the terrain features within a segment of the sensor field-of-view, in order to track areas containing targets whose distinguishing characteristics are not prominent, due to conditions such as camouflage. Upon initiation of tracking, an area tracker stores a reference area signature in a memory, and then derives angular pointing errors based upon the results of a comparison between subsequent area signatures and the earlier memorized reference. An area tracker will track stationary targets and because it operates on the terrain features surrounding the target, it has a built-in immunity against enemy countermeasures.

The present invention relates to techniques for obtaining electronic area signatures compatible with circular, polar or cartesian coordinate imaging systems, such signatures being used for automatic tracking and employable for weapon guidance, platform stabilization, intrusion detection, fire control, and landing aids.

THE PRIOR ART

The present invention may, for example, be utilized to provide the input data for the Circular Scanning Tracking System data processor disclosed and claimed in the Bogard et al U.S. Pat. No. 3,372,890, issued Mar. 12, 1963 and assigned to the assignee of the present invention. The use of the present invention therewith eliminates the moving parts in the Bogard et al system, while providing display and error signals. More particularly, the present invention replaces the mechanical slit scan area signature generator described in that patent, and in so doing serves as an alternate source of area signature data to that device. Therefore, the instant invention may be regarded as providing the Bogard invention with a non-mechanical, solid state area signature generator equivalent to the mechanical apparatus taught in that device in order to generate the area signatures required.

Referring now to the Altman U.S. Pat. No. 3,593,286, it is to be noted that our invention performs a function that in effect was asserted by this patentee to be unrealizable because of the high frequency nature of the output of a line scanning sensor; note column 2 of that patent. In contrast therewith, we maintain that by proper utilization of our invention, it is possible to obtain a realizable and effective low frequency area signature for area trackers, even though the source be a high frequency single dimension scan.

Turning to the Scarbrough U.S. Pat. No. 3,707,598, assigned to the assignee of the present invention, it is to be noted that there is no conflict between the present invention and that one, because that patentee is processing a single line of video from a point scan sensor in order to perform a pattern recognition function, and his patent is largely involved with the technique of generating the error signal from the single line of video. In contrast, we are interested in processing a group of scan lines so as to obtain a representation of an area. The area signatures provided by our invention effectively serve as a source of information to the device in accordance with the Scarbrough patent in the instance where his embodiment has as the desired function, a pattern recognition operation on an area, as opposed to a single line of the sensor scan.

The compatibility of the present invention with other television trackers thus makes possible the combination of area tracking and moving target tracking systems, and it should be noted that the use of the filtered data as the input to the moving target trackers lowers the acceptable target contrast level and facilitates anticipation of target position when the target is temporarily obscured.

Therefore, it is to be realized that our invention distinguishes from the prior art in a variety of ways, including the fact that it eliminates the need for any mechanical scan apparatus, it is operable with existing camera systems, including such specialized cameras as low light level TV, laser sensitive TV, FLIR in instances where a TV scan format is provided at its output, and solid state sensors such as CCD's and CID's. Also, it provides means for simultaneously generating information for tracking from the same information used for visual display, and it eliminates any boresighting problems in that it does not require multiple sensors.

SUMMARY OF INVENTION

Our invention may be characterized as being an area signature detection system utilized in a novel way with a line scan sensor, such that low frequency scene content, necessary for area correlation processing, can be extracted from a wide bandwidth line scan sensor, such as normally associated with a television type scan format.

In accordance with our invention, we employ novel vertical and horizontal area signature detectors in order to obtain a vertical area signature and a horizontal area signature from the selected type of scan format. This is specifically accomplished in the case of the vertical area signature detector by gating and integrating selected portions of the scan lines as they are being read out by the sensor utilized. When results of this integration process are sampled and held over a series of scan lines, we are able to extract low frequency content information from a segment in a direction orthogonal to the line scan direction.

In the case of the horizontal area signature detector, the gated portion of the scan line is stored in a delay circuit equivalent to the time of a scan line so that the earlier stored scan line can be iteratively summed with additional scan lines so as to enable us to obtain a low frequency signature descriptive of area contrast variations along the scan line direction.

These two novel approaches had heretofore been thought unobtainable from a high frequency scan mechanization such as is normally associated with television type sensors. The impact of our area signature generation techniques can be more fully appreciated after it is fully realized that they in no way require change or modification to existing sensors, and are not associated with any mechanical hardware. Thus, in comparison with known prior art, our invention makes possible the utilization of a highly advantageous technique of signature processing which is simpler, less expensive, more versatile, smaller, lighter and has greater resolution, which characteristics are all important when considering applications involving airborne environment.

Therefore, a primary object of our invention is to provide an area signature detection system usable with a line scan sensor in such a way as to enable the creation of area signatures employable in the determination of error signals.

Another object of our invention is to provide apparatus interacting with a line scan sensor in order to generate area signatures, which sensor can employ a scan format involving rectilinear scan, radial scan, or circular scan.

Yet another object of our invention is to provide an area signature detection system utilizing at lease one area signature detector for creating an analog signature characterizing area variations within the field of view of the sensor used therewith, which signature can be used in the development of error signals.

Still another object of our invention is the provision of an area signature detection system in which a pair of area signature detectors are used in the generation of area signatures, with the signature from one of said detectors being orthogonal to the signature from the other of said detectors, thus to enable the generation of error information usable in guidance, tracking or fire control.

It is another object of this invention to provide a novel method and apparatus for obviating the deficiencies of the prior art, and for generating analog area signatures by the use of a standard vidicon camera system or other imaging system utilized as the image transducer.

It is another object of the present invention to provide a novel method and apparatus for stabilized platform control in which, through the use of zoom optics or image zoom devices, range closure may be compensated for with proper control of the image, thus maintaining tracking accuracies over extremely large range variations.

It is another object of the present invention to provide a novel method and apparatus for missile control in which roll angle inputs in excess of plus or minus 10 degrees may be acceptable in the production of pitch and yaw error signals.

It is still another object of the present invention to provide a novel method and apparatus which is compatible with a plurality of sensors, which is small in size and which utilizes solid state components.

It is yet a further object of the present invention to provide a novel method and apparatus in which a single sensor provides both a pilot display of the area tracked as well as the tracking input data, with the use of multiple gimballed sensors being eliminated.

It is still another object of the present invention to provide a novel method and interfaced tracking apparatus which is compatible with low light level, silicon (infra-red), FLIR video systems, and line-scanning systems.

The electronic signature developed in the apparatus of the present invention may in addition be utilized with point trackers in the tracking of moving targets. It is, accordingly, yet still another object of the present invention to provide a novel method and system for selectively tracking an area or a moving target within the area.

It is yet still a further object of the present invention to provide a novel method and system for predicting the position of a temporarily obscured moving target within the area scanned.

Still a further object of the present invention is to provide a novel method and tracking apparatus with decreased contrast level tracking capability.

Another object of the present invention is to provide a novel method and area tracker with the capability of tracking targets of opportunity.

These and other objects, features and advantages of the present invention will be more apparent when read in conjunction with the appended drawings.

THE DRAWINGS

FIG. 2 is a pictorial representation illustrating one use of our invention, involving a guided missile employing a combination of novel components such that guidance signals may be derived and utilized so as to cause the missile to strike the intended target;

FIG. 3a is the first of three related figures illustrating the variations of gating arrangements that can be used with our invention to process portions of the sensor field of view, involving the utilization of orthogonally disposed segments specifically oriented toward a television scan format;

FIG. 3b is an arrangement of segments relatable to an application in which a major disturbance may exist in the center of the field of view, and the desired fire control functions must be derived from surrounding terrain features;

Figure 1:
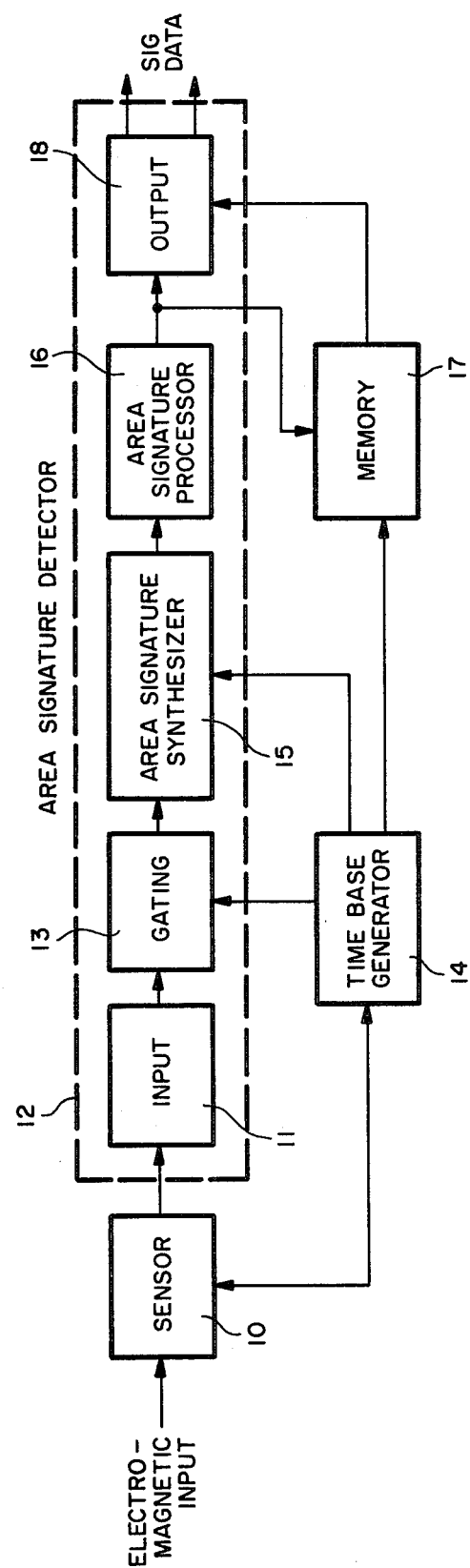
FIG. 1 is a block diagram of a basic version of our area signature detector invention, shown operatively associated with a sensor, time base generator, and memory means.
Figure 4A:
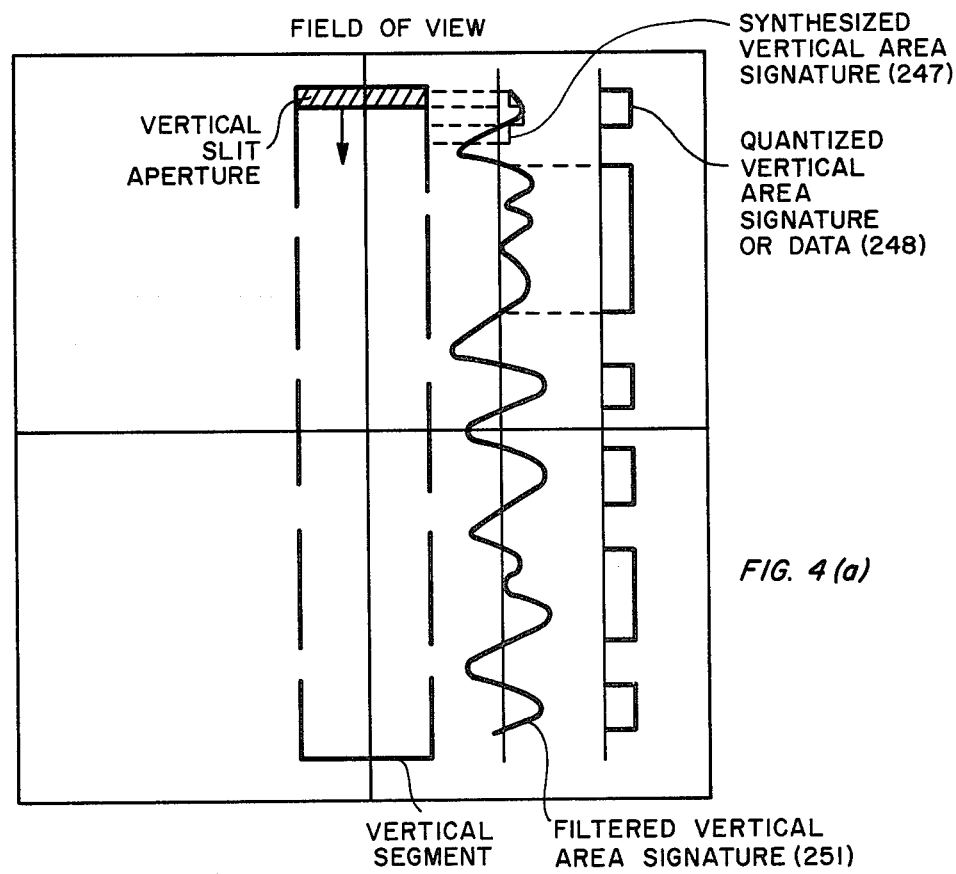
Figure 4B:
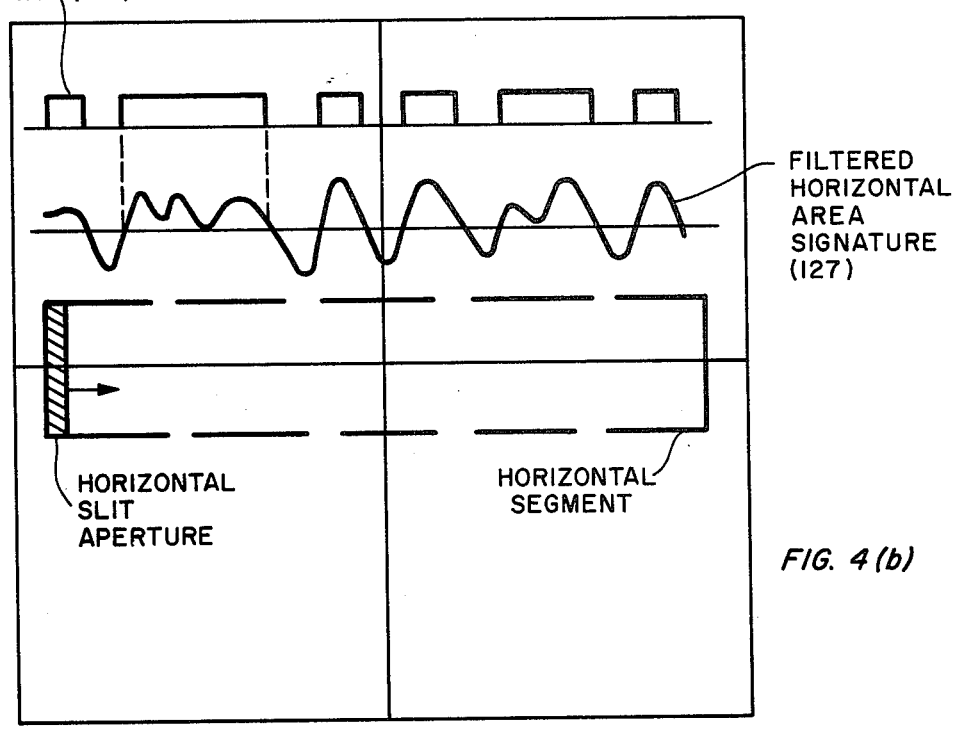
Figure 5A:
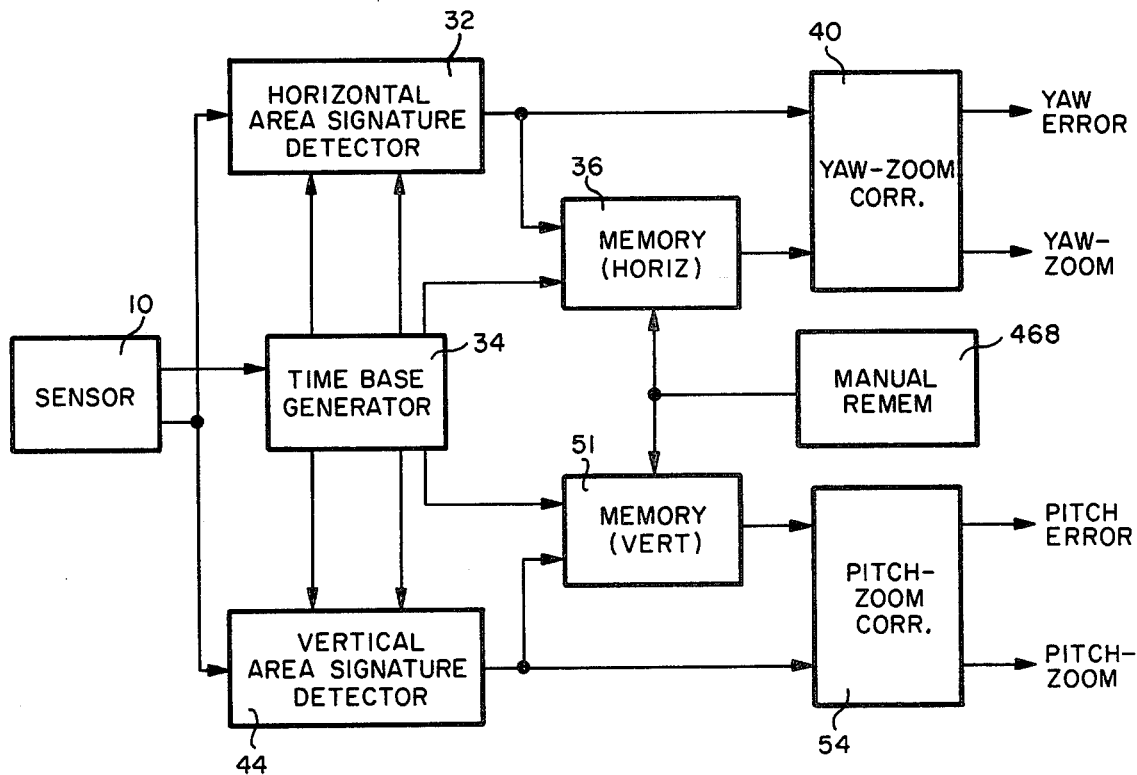
Figure 5B:
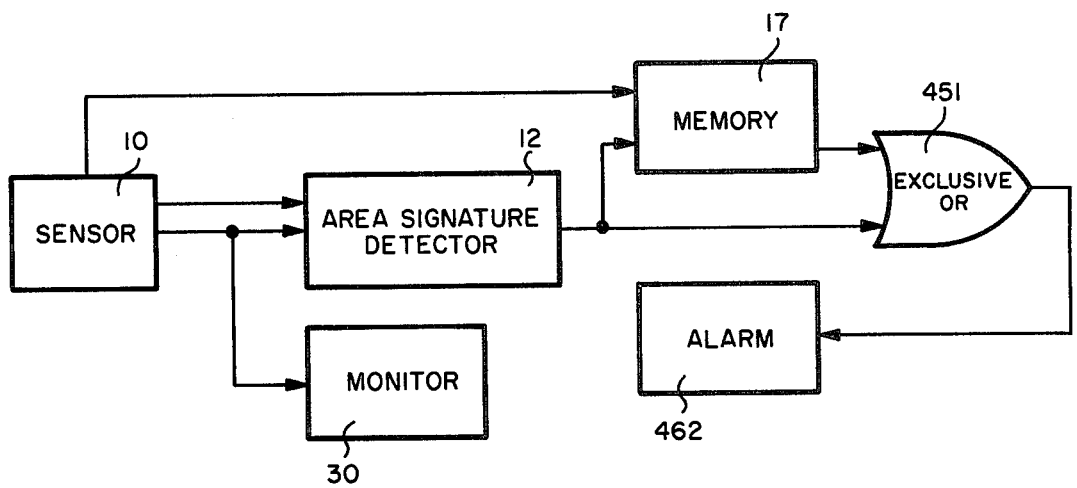
Figure 7:
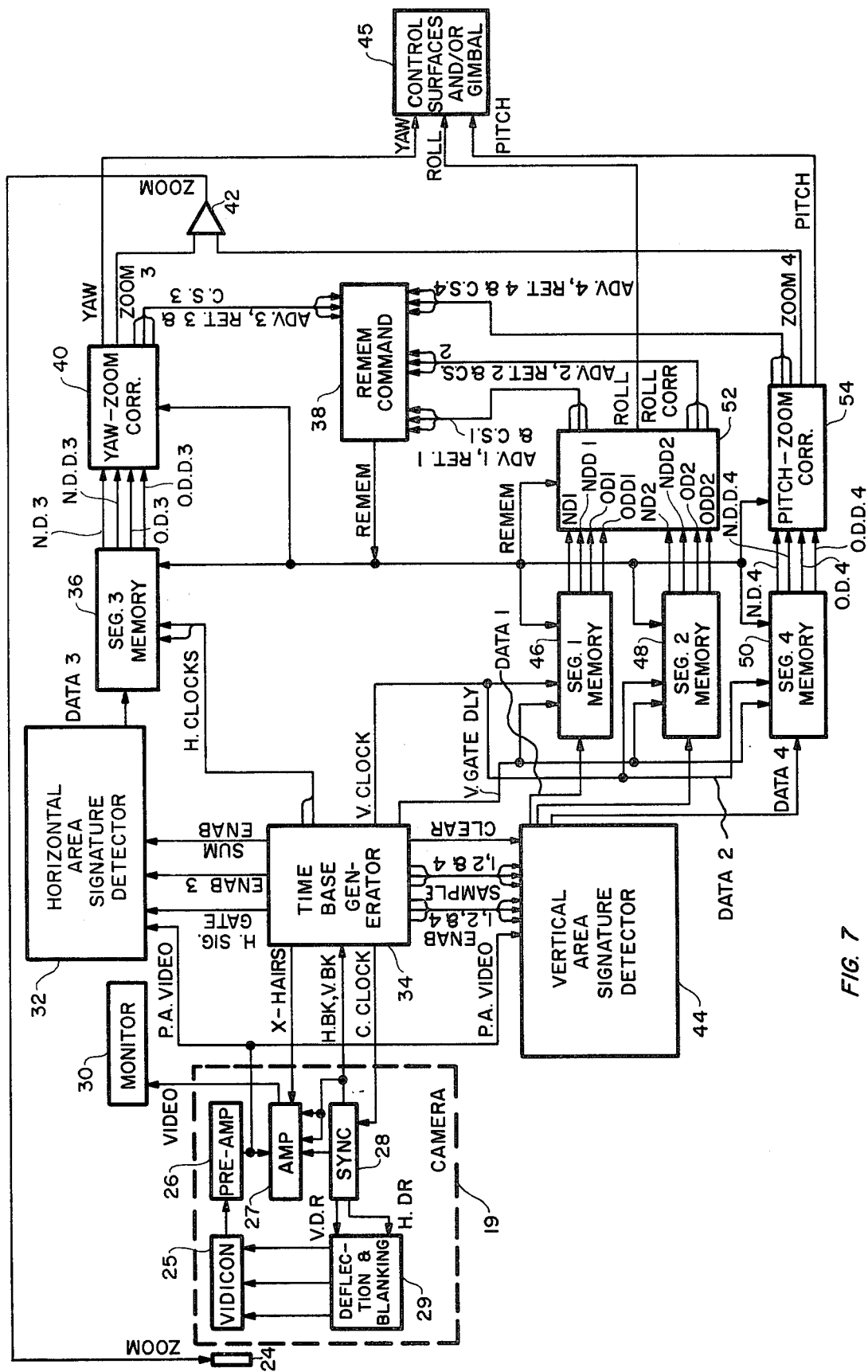
Figure 8:
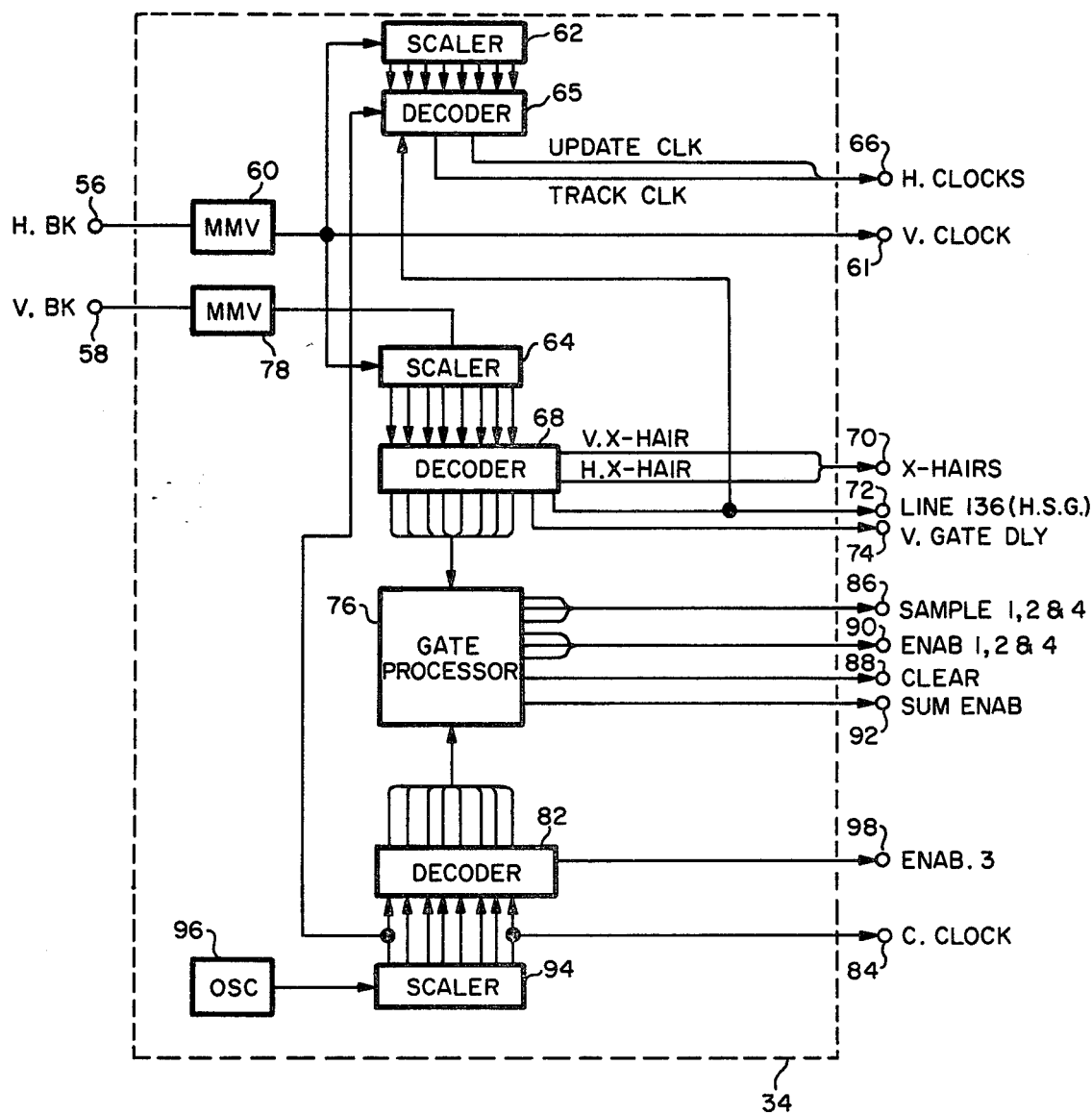
Figure 12A:
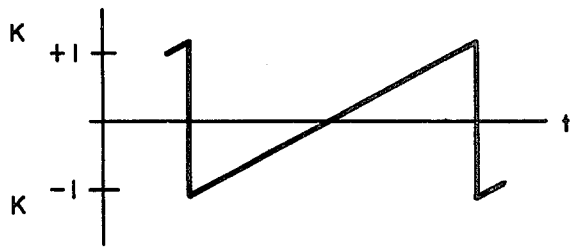
Figure 10:
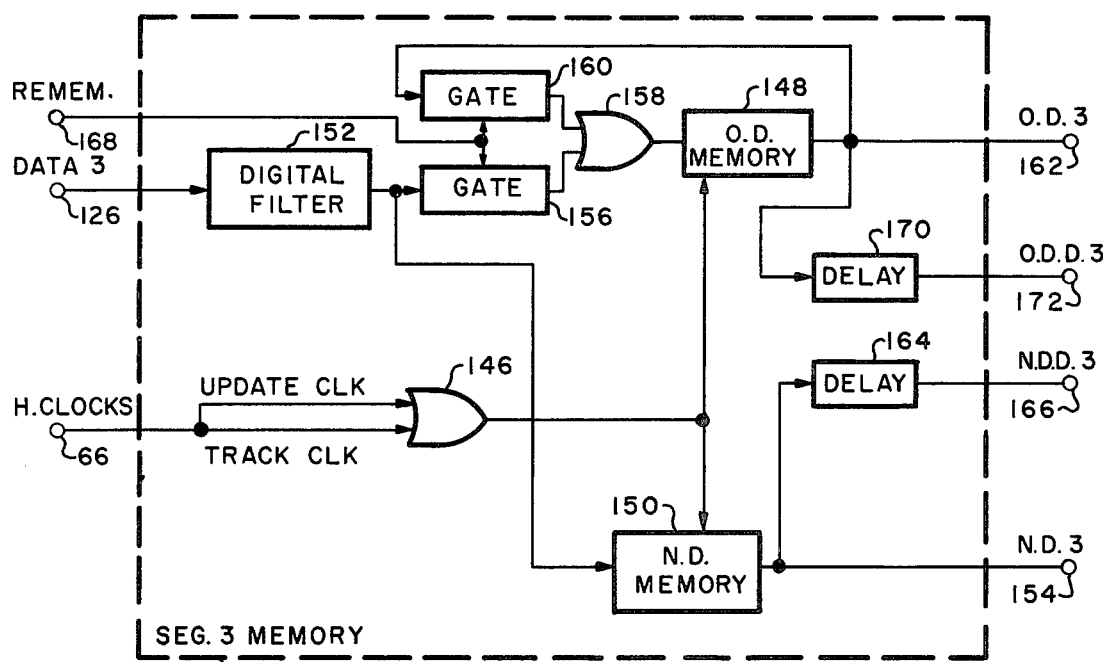
Figure 11:
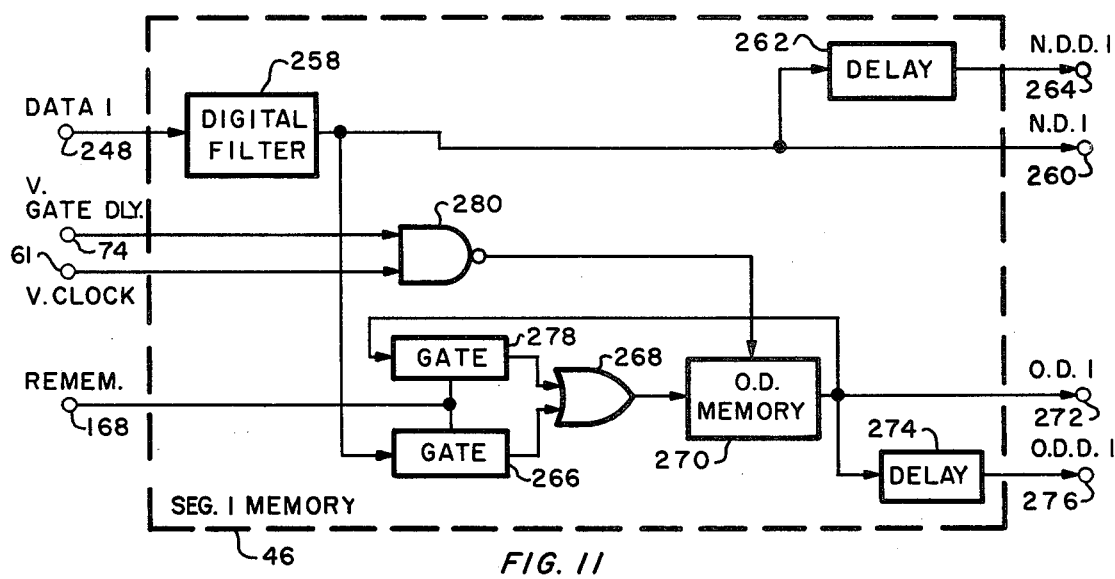
Figure 12:
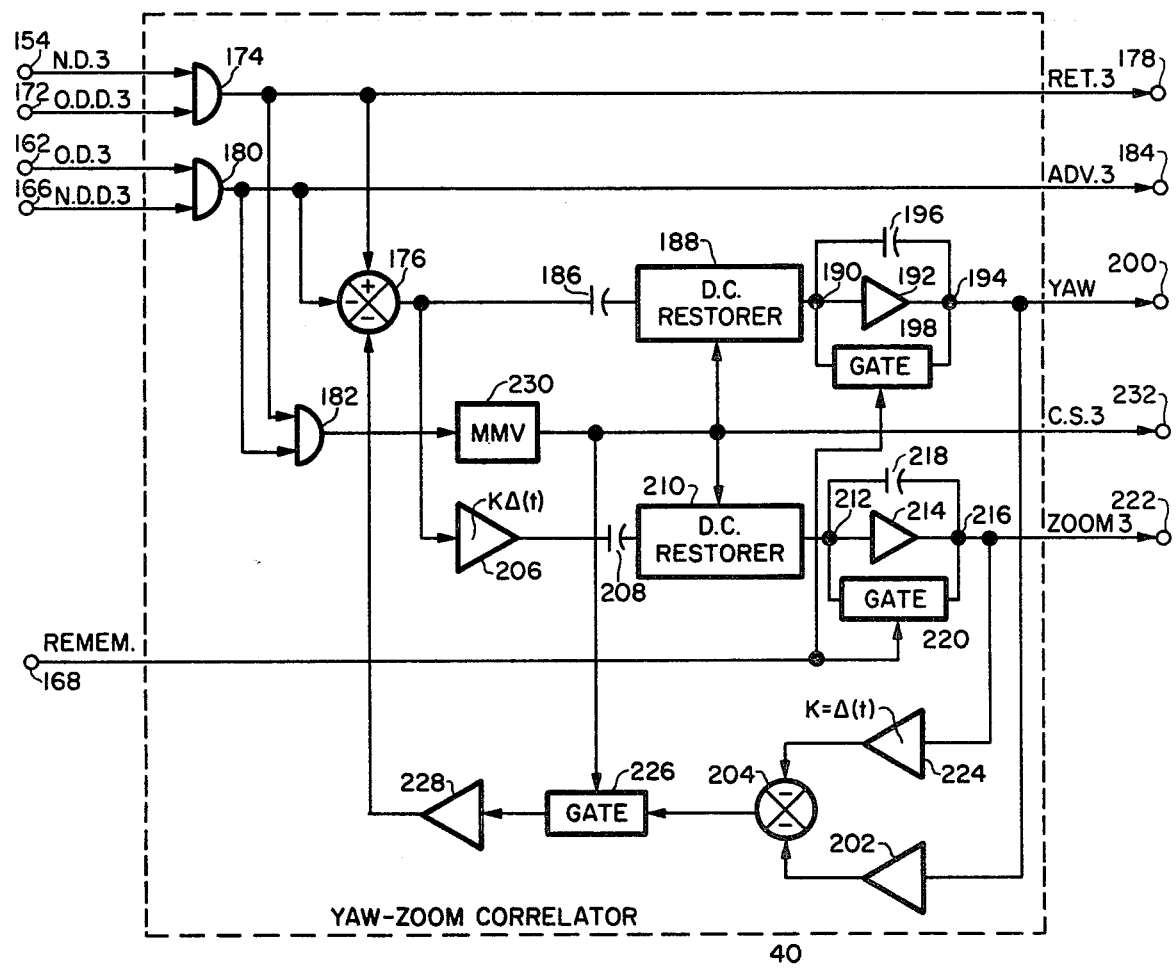
Figure 13:
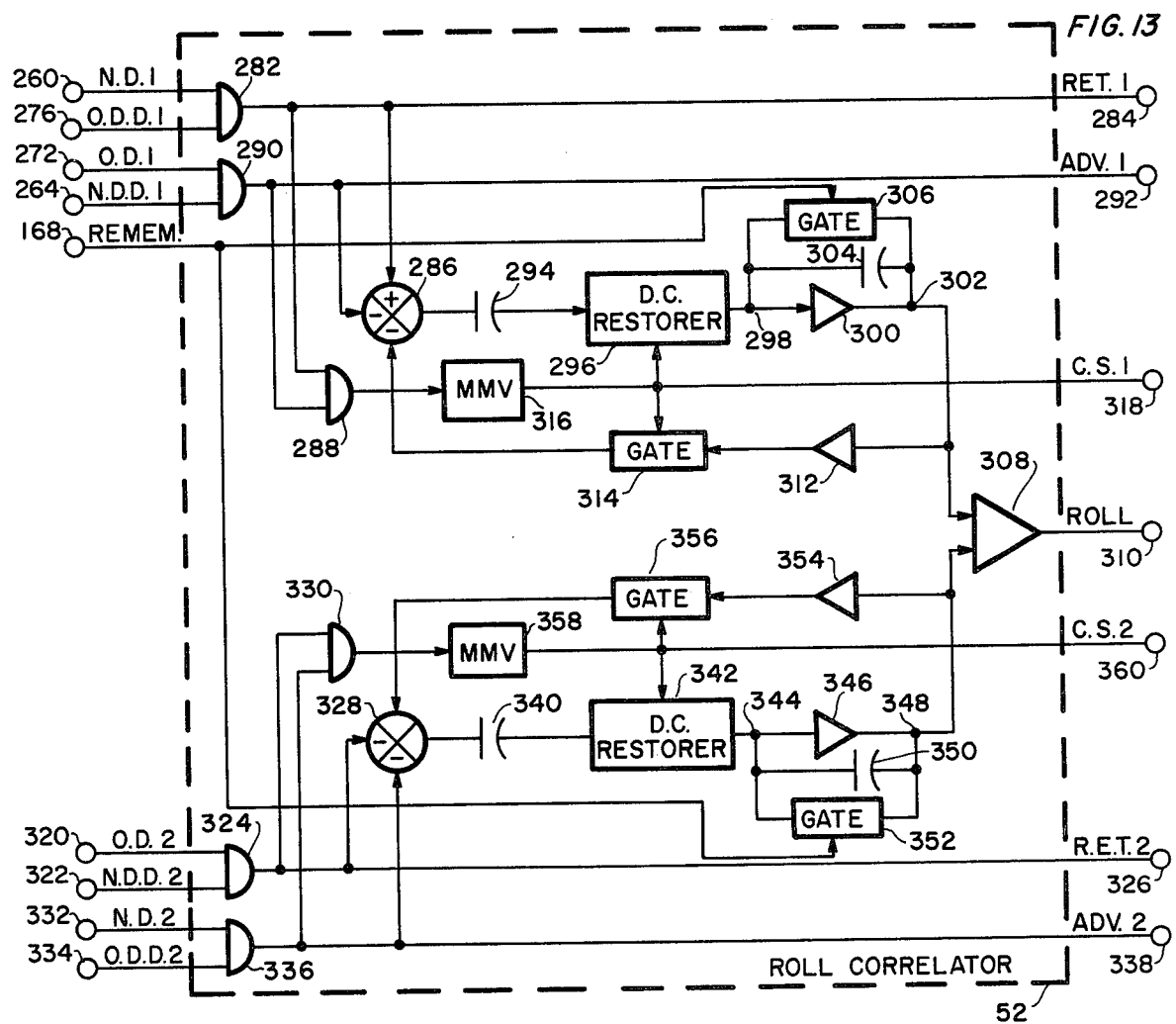
Figure 14:
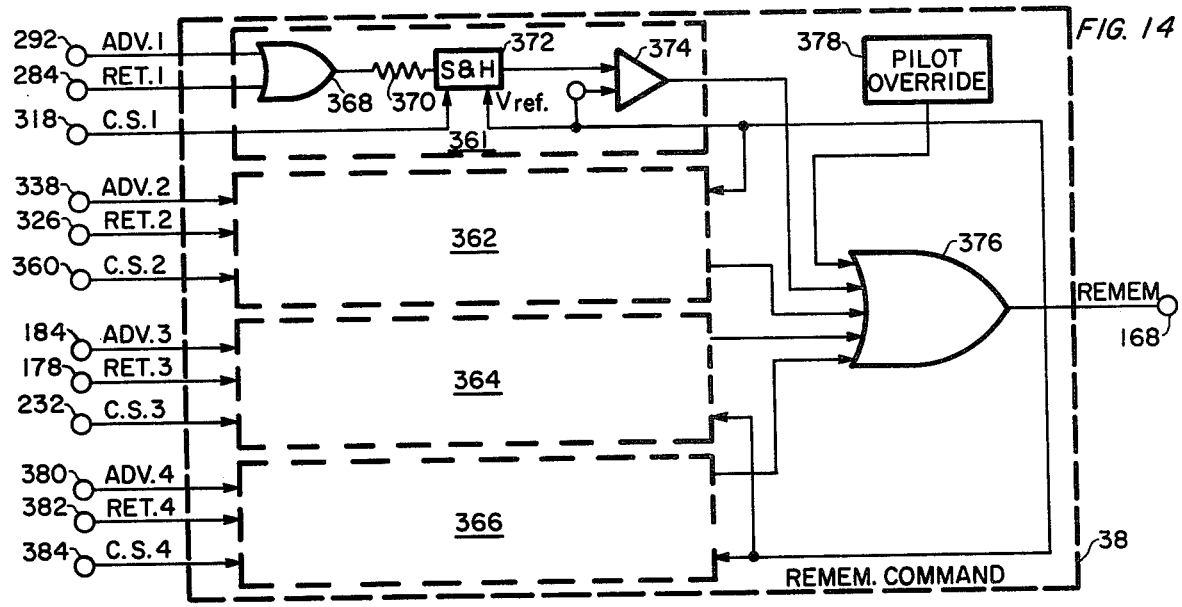
Figure 15:
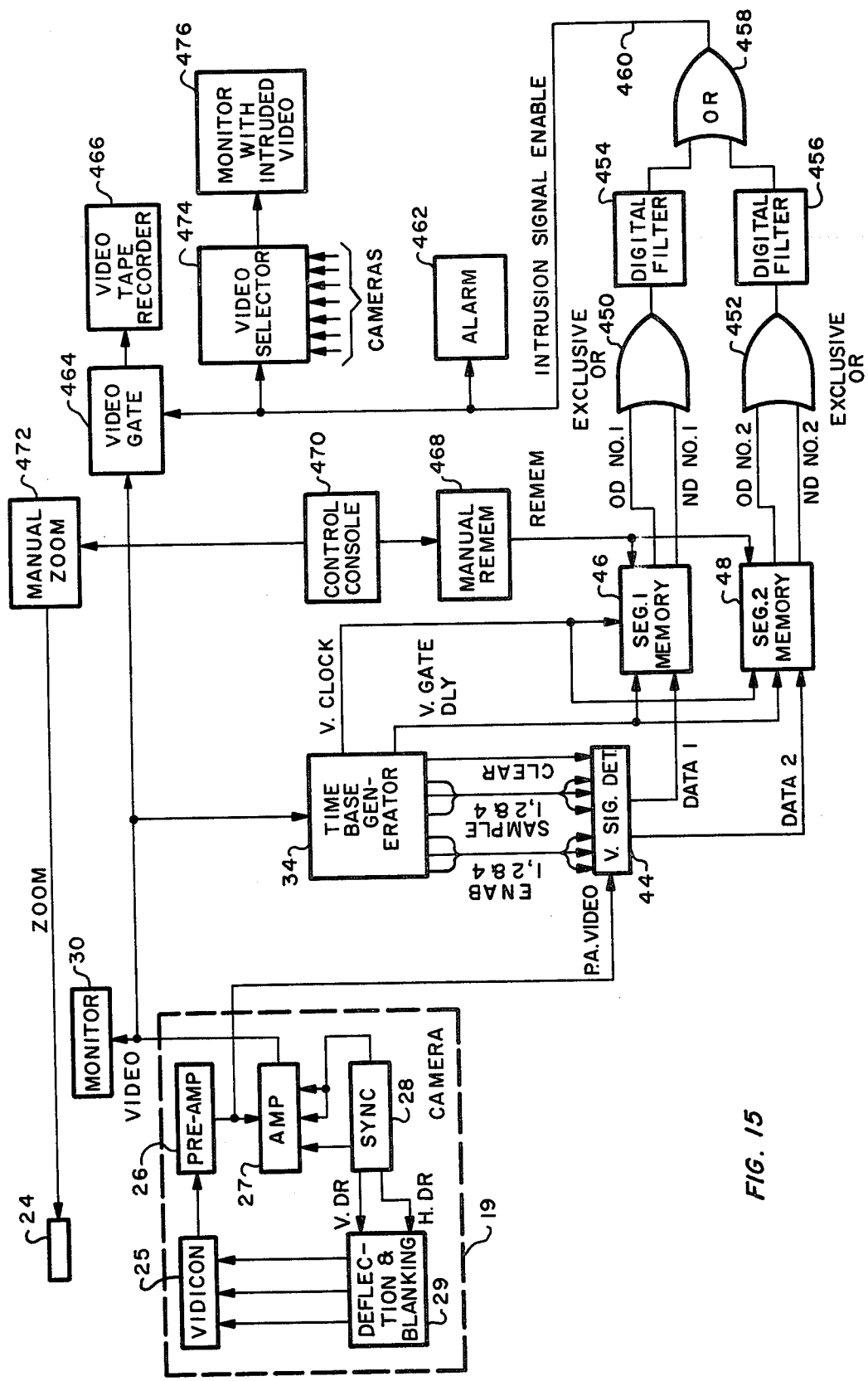

FIG. 3c teaches an arrangement of segments such as may be effectively used in connection with missile guidance;

FIGS. 4a and 4b depict the results of processing a television scan format with our invention, with these figures showing the waveforms that appear at the outputs of various components illustrated in FIG. 1, with FIG. 4a illustrating the results of processing a vertical segment, and FIG. 4b illustrating the results of processing a horizontal segment;

FIGS. 5a and 5b represent functional block diagrams of two specific, basic embodiments of our invention;

FIG. 6a is a functional block diagram of the vertical area signature detector of FIG. 5a;

FIG. 6b is a functional block diagram of the horizontal area signature detector of FIG. 5a;

FIG. 7 is a block diagram of a preferred form of a missile tracker system in accordance with our invention, in which a pair of orthogonally related area signature detectors is utilized in order to develop line of sight steering commands, including yaw and pitch errors as well as the detection of roll and zoom, such as may be effectively used to control the flight path of a missile with which it may be used;

FIG. 8 is a functional block diagram of the time base generator of FIG. 7;

FIGS. 9a and 9b are vertical and horizontal timing diagrams, which illustrate the output signals from the time base generator of FIG. 8;

FIG. 10 is a functional block diagram of the segment 3 memory circuit of FIG. 7;

FIG. 11 is a functional block diagram of the segment 1 memory circuit of FIG. 7, which showing is also representative of segment 2 and 4 memories of FIG. 7;

FIG. 12 is a functional block diagram of the yaw-zoom correlation circuit of FIG. 7, and is also representative of the pitch zoom correlation circuit;

FIG. 12a is a graphic illustration, of the manner in which the gain of one of the amplifiers of FIG. 12 is varied as a function of time to introduce a selective weighing in the zoom control as a function of the time position of the difference error pulses emanating from a summing circuit also of FIG. 12;

FIG. 13 is a functional block diagram of the roll correlator circuit of FIG. 7;

FIG. 14 is a functional block diagram of the rememorization command circuit of FIG. 7; and FIG. 15 is a functional block diagram of an intrusion detection embodiment of our invention, which may be regarded as an expansion of the more basic configuration of FIG. 5b.

DETAILED DESCRIPTION

Turning first to FIG. 1, which is a block diagram of a basic form of our invention, it will be noted that sensor 10 is designated to be receiving an input which is part of the electromagnetic spectrum. Although we are not to be limited to any particular form of sensor in view of the wide range of applicability of our invention, it is to be noted that sensor 10 is ideally a line scan sensor providing an amplitude varying electrical waveform as an output to the input means 11.

The output of the sensor is processed by the area signature detector 12 into what we refer to as an area signature. Area signatures, both real time and stored, serve as the output of the area signature detector 12 and are indicated in FIG. 1 to be signature data. These area signatures for example would be representative of area variations in the content of a scene within the field of view of a television type sensor, or variation in the thermal radiation of the scene in the event an infrared sensor is used. However, we are not to be limited to television type sensors, and for example our invention is applicable for use with a radar type sensor, in which instance the signature generated of the scene would be determined by the radar return.

It is therefore to be seen that the sensor can take the form of a television camera, a low light level TV sensor, a radar, FLIR or any other line scanning sensor operative in the electromagnetic spectrum. Further, the sensor can take the form of a wide variety of line scanning devices, which may involve any of several scan formats, such as cartesian, circular, or polar scan format. The terminology "scan format" is of course descriptive of the way the sensor face plate is electronically interrogated.

Inasmuch as the block diagram set forth in FIG. 1 is typically used in airborne equipment such as missiles, helicopters, fixed wing aircraft or the like to derive error signals, it can be termed a tracker. In this instance, the word "tracker" is used to describe the apparatus which monitors the relative change of the stored and real time area signatures, and derives control signals therefrom in such a fashion as to generate the necessary errors which will serve to command a change in the sensor line of sight, to minimize the difference between stored and real time area signatures.

As mentioned above, the output from sensor 10 is directed into the input portion 11 of the area signature detector 12. The general form of the input 11 is an impedance matching circuit which provides the necessary interface between the sensor output and the input to the gating means 13 of FIG. 1. In its simplest form the input could be simply an interconnecting wire, but in most cases the input would take the form of a differential line receiver for the express purpose of properly terminating the output from the sensor as it arrives at the input to the area signature detector 12.

The gating means 13 of the area signature detector serves to selectively gate that portion of the sensor field of view that has been received by the input means, and which is to be used for the purpose of generating an area signature. The gating means 13 is operatively associated with the time base generator 14, as will be described at length hereinafter, with the output of the gating means being received by the area signature synthesizer 15. The gating means in its simplest form is a time sequence controlled switch, and in most applications it would take the form of a field effect transistor gate capable of processing information, and selected so as to have sufficient bandwidth respone to accommodate the video signal arriving from the sensor 10 through input means 11 and gating means 13.

A momentary digression to FIGS. 6a and 6b reveals that a gate 234 is utilized in FIG. 6a, and a gate 102 is utilized in FIG. 6b, with each of these being comparable to the gating means 13 of FIG. 1.

The time base generator 14 of FIG. 1 provides the necessary functions of synchronizing the sensor time base and the sequential operations of the gating, memory and area signature synthesizer means. The time base generator in its simplest form may comprise a master crystal oscillator, normally referred to as master clock, and a counting chain whose function is to divide down the master clock in order to derive the necessary synchronous time base signals for use in the organization of the tracker shown in FIG. 1 in the proper time sequence. The time base generator is of a type to be found in day-to-day applications, such as computers, television systems and the like, and no patentable novelty is to be ascribed to the time base generator per se. This component is further discussed as part of the detailed description of the preferred embodiment shown in FIG. 7.

The principal function of the area signature synthesizer 15 of FIG. 1 is to process the output from the gating means in such a manner as to create an analog signature characterizing the target area variations within the sensor field of view and as selected by the gating means. It is to be noted that the output of the area signature synthesizer is a time varying electrical waveform which represents a synchronous assemblage of the individual scan lines which existed within the portion of the sensor field of view selected by the gating means.

The area signature synthesizer 15 may be regarded as an electronic formulation of a process that can be approximately discussed in conjunction with a mechanical analogy. Considering the two slit apertures diagrammatically shown in FIG. 3a, if these were mechanical slits and they were traversed in the directions as shown by the arrows in FIG. 3a, they would scan out two orthogonally positioned segments, referred to as the horizontal and vertical segments, which are of course representative of the area within that portion of the field of view traced out by the slit motion. Our invention electronically simulates the motion of two such slits, with the result being the creation of an electronic area signature whose amplitude variations are descriptive of area contrast variations in the terrain features on the target plane.

It will be recalled that one novel aspect of our invention is represented by its ability to provide a means of extracting low frequency target area variations while using information derived from a sensor having a line scan format, this of course involving a technique of the type deprecated in the prior art because of the inherent high frequency nature of the output that is obtained from a point scan sensor. Advantageously, our area signature detector, when used in conjunction with a point scanning sensor, time base generator, and a memory means can thus provide the equivalent performance of the mechanical systems of the prior art without the complexity of moving parts and the relative bulk and weight normally associated with that type of apparatus.

Continuing with the subject of area signature synthesizers, two novel approaches can be associated with the generation of the horizontal and vertical area signatures. The horizontal area signature detector shown in FIG. 6b has as its principal variation, a horizontal area signature synthesizer 15b comprising summing amplifier 106, the gate 112, the scaler 128, and the delay 130. The details within the delay 130 are illustrative of an analog delay line module, but the delay could just as easily be considered as a digital shift register processor.

Likewise, the vertical area signature detector of FIG. 6a has as its principal variation, a vertical area signature synthesizer 15a which comprises integrator 238 and its associated capacitor 242 and gate 244, these being operatively associated with sample and hold 246. The integrator could of course involve a digital process as opposed to an analog process, with the sample and hold likewise being appropriately different.

Returning to FIG. 1, the signature processor 16 comprises a bandpass filter and binary quantizer and is used to select the desired spatial frequency content from the area signature synthesized by operation of the area signature synthesizer 15. This portion of the area signature detector 12 may be regarded as being illustrated in FIG. 6a by components 250 and 252, and in FIG. 6b by components 116 and 124. In a preferred embodiment, the signature processor filter portion would be for example a fourth order Butterworth bandpass filter whose corner frequencies are so defined as to guarantee that the spatial frequency content, desired in order to obtain the required tracking performance, is obtained.

The quantizer portion of the area signature processor is used to form a series of binary pulses from the output of the filter described above. Such quantizer has the general form of a voltage comparator, and in association with the embodiment described in FIG. 7, is required due to the type of correlation error processor used in the correlators 40 and 54 shown in that figure. In some instances the correlation error processor might not require the step of quantization, so in such instance the output of the filter 116 in FIG. 6b would be used to derive the tracking commands.

The output means 18 shown in FIG. 1 serves to provide a similar impedance matching function as the input means in that it interfaces the output of the area signature processor with the memory means 17 of FIG. 1, or with the correlation error processors shown in FIG. 5a and FIG. 7. As in the case of the input means, the output means in its simplest form may consist of nothing more than a wire serving to interconnect the components. In most cases, however, the output means will take the form of a differential line driver.

With reference now to FIG. 2, a guided missile 20 is illustrated in flight toward a target, such as a bridge 21. A television camera in the nose portion 22 of the missile 20 is utilized through the circuitry of the present invention to position control surfaces, such as ailerons 23 associated with the horizontal and vertical stabilizers of the missile. The flight path of the missile 20 may of course be altered in a conventional manner responsive to the positioning of the various control surfaces. Rather than being limited to ailerons, the controls may involve any suitable conventional system, such as thrust deflectors, propulsion units, or the like.

The field of view of the television camera 19 in the nose of the missile may be displayed on any suitable conventional monitor 30 as represented in FIG. 7. As depicted in the monitor displays of FIGS. 3a, 3b and 3c, the area of the field of view can be divided into segments which represent that portion of the sensor field of view used for the generation of the area signatures necessary for performing the desired function.

As will quickly be apparent, FIGS. 3a through 3c represent various configurations of segments, from which can be selected that configuration most suitable for a given utilization.

For example, the configuration of segments shown in FIG. 3a is one that is most suitable for fire control, for this arrangement will enable suitable left-right and up-down information to be generated in accordance with this invention. FIG. 3b depicts a segment configuration most appropriate for use with a hover position control system, where the center of the field of view might be blooming due to laser range returns.

FIG. 3c represents a segment configuration particularly adapted for guided missile application, for in addition to using orthogonally disposed segments 3 and 4 enabling the generation of pitch and yaw, it also uses outer segments 1 and 2, added in order that roll attitude information can be obtained. These three figures will be referenced further as the description of our invention proceeds.

Turning now to FIGS. 4a and 4b, these figures are included as representative examples of the waveforms obtained when one uses the facet of our invention represented by FIGS. 6a and 6b. The waveforms of FIGS. 4a and 4b correspond to the segment orientation shown in FIG. 3a, and more specifically, FIG. 4a is illustrative of the waveforms obtained when the vertical slit aperture discussed in connection with FIG. 3a is synthesized as moving in a direction across the field of view indicated by the vertically disposed arrow. The synthesized vertical area signature appears as a staircase waveform in FIG. 4a, which is typical of the sample and hold output obtained at terminal 247 in FIG. 6a. The filtered vertical area signature appearing in FIG. 4a is a smooth, time-varying waveform, which is obtainable at terminal 251 in FIG. 6a, with time varying frequency components indicative of the spatial frequencies processed by the passboard filter 250. The quantized vertical area signature or data of FIG. 4a appears at terminal 248 of FIG. 6a, and would be the output of quantizer 252 when an input such as the illustrated filtered vertical area signature is provided. Similar relationships exist between FIGS. 4b and 6b, and are sufficiently obvious as not to need detailed explanation.

Turning now to FIG. 5a, this will be seen to be a block diagram representative of a basic form of our invention, as utilized in an operational environment suitable for missile or other vehicle use. In this embodiment, two variations of our area signature detector, namely a horizontal area signature detector 32 and a vertical area signature detector 44 are used in conjunction with a cartesian coordinate scan sensor, such as a television sensor, to derive area signatures in the form of horizontal and vertical segments, along the lines of those shown in FIGS. 4(a) and 4(b). It is to be noted in FIG. 5a that only one time base generator 34 is required for synchronization between the area signature detectors 32 and 44 and the sensor means 10.

In order to generate outputs in the form of tracking error signals, it is necessary to provide the correlation error processors, the yaw-zoom correlator 40 and the pitch-zoom correlator 54, with stored or old data representative of an earlier scan of the sensor field of view. This is accomplished by the provision of memory means 36 and 51 in conjunction with the correlators 40 and 54, respectively, with the memory means 36 being explained in detail in FIG. 10. In addition, each correlation error processor must have current or new data representative of the current scan of the sensor field of view. Using old data and new data inputs, each correlation error processor derives the necessary information in the form of yaw and pitch errors for commanding the missile or other vehicle so as to minimize the degree of mismatch between the old and new data streams, in this way performing an automatic tracking function. When the embodiment of FIG. 5a is operatively used with a mechanical gimbal, for example, it therefore becomes an embodiment of a seeker.

The level of detail shown in FIG. 5a is expanded in the description associated with FIG. 7 in order to provide the teaching necessary for construction of a realizable operational missile tracker embodiment.

Referring now to FIG. 5b, it can be seen that this figure amounts to an alternate application of our invention usable for intrusion detection, wherein the time base generator has been eliminated, and the yaw zoom and pitch zoom correlation error processors have been replaced with an exclusive OR function 451. The exclusive OR function serves to detect a simple difference between the reference and live data on a logical one-/zero basis. This block diagram is discussed in greater detail in the preferred embodiment shown in FIG. 15 and is used to monitor changes occurring between the live and stored area signatures, with the result being the activation of an alarm. Thus, the device of FIG. 5b provides motion detection instead of the proportional output error obtained from the use of the systems defined by FIGS. 5a and 7.

As should now be obvious, when our invention is used for missile guidance, a pair of area signature detectors is employed, with the analog signature from one detector being orthogonal to the analog signature from the other detector. Although for convenience we have explained our invention in terms of use with a sensor employing a scan format involving rectilinear scan, our time base generator can be configured so as to enable us to derive the signals necessary for synchronizing a polar or circular sensor. In latter instances, it would only be necessary to supply information relatable to a circular or polar plot, as opposed to a cartesian plot, to the area signature detectors.

With reference to FIG. 7, the television camera 19 mounted in the nose of the missile 20 illustrated in FIG. 2 includes conventional optics 24 and a vidicon tube 25. The output signal from the vidicon tube is fed through a preamplifier 26 to provide a P.A. VIDEO output signal. This P.A. VIDEO signal is applied to a video amplifier 27 to provide the VIDEO output signal, which signal may be applied to a suitable conventional monitor 30, such as of the type mentioned hereinbefore.

The VIDEO signal is representative of the field of view of the television camera and is organized in a conventional 525 line, 30 frames per second scan format with 2 to 1 interlace. It is to be noted that this signal is a high frequency, real time representation of the sensor's field of view, and it is also to be noted that the timing waveforms of FIGS. 9a and 9b discussed hereinafter involve this standard type of TV camera scan format.

Also included in the circuitry of television camera 19 are sync circuits 28, which provide SYNC signals to the video amplifier 27, and a horizontal drive (H. DR.) and vertical drive (V. DR.) signals to the deflection and blanking circuits 29. The deflection and blanking circuits 29 in turn supply horizontal deflection (H. DEF.), vertical deflection (V. DEF.), and blanking (BLANK) signals to the vidicon tube 25.

The components of the television camera 19 as described above are all conventional both in their circuitry and operation, and consequently the modus operandi need not be described in further detail. Although we have reference in FIG. 7 the use of a television camera, it is of course to be understood that we are not to be limited thereto, and for example we may use in lieu thereof a low light level TV, a FLIR, a solid state sensor (CCD or CID), or the like.

Returning to the camera portion of FIG. 7, it is to be observed that vertical blanking (V. BK.) and horizontal blanking (H. BK.) signals are also generated by the sync circuits 28 within the camera 19 and are applied to a time base generator 34 in response to a camera clock (C. CLOCK) signal derived from the latter device. The C. CLOCK, V. BK. and H. BK. signals are necessary to insure synchronization and thus the adaptibility of different types of television cameras to the present invention. The time base generator 34 thus provides all of the interval timing and sequence control signals utilized to gate the P.A. VIDEO signal for processing in the circuitry hereinafter described.

The time base generator 34 also provides cross-hair (H.X-HAIR and V.X-HAIR) signals to the television camera 19 where they are injected into the amplifier 27 for display on the monitor 30.

The P.A. VIDEO output signal from the camera 19 is applied to a horizontal area signature detector 32 which is described in more detail in connection with FIG. 6b. The horizontal area signature detector 32 receives the horizontal signature gate, which is line 136 for a 525 line system; see also FIG. 9a. The horizontal area signature detector also receives a Segment No. 3 enabling signal (ENAB. 3) and a summing loop enable (SUM. ENAB.) signal from the time base generator 34. As will be explained in more detail in connection with FIG. 6(b), the H. Sig. Gate (Line 136), ENAB. 3 and SUM. ENAB. signals are utilized to gate the portion corresponding to the Segment No. 3 described in connection with FIG. 3(c).

It is to be noted that the horizontal area signature detector 32 generates a real time area signature whose configuration is representative of the scene beheld by the sensor 10. The output of the horizontal area signature detector, termed DATA 3 in FIG. 7, is directed into the segment No. 3 memory circuit 36, which latter device is also connected to receive a rememorization signal REMEM from a memorization command circuit 38 described in detail hereinafter in connection with FIG. 14. The memory circuit 36 supplies to a yaw-zoom correlator 40, current or new data (N.D.3) and a delayed new data (N.D.D.3) signal, as well as stored or old data (O.D.3) and delayed (O.D.D.3) signals from an earlier scan of the sensor. These N.D.3, N.D.D.3, O.D.3 and O.D.D.3 signals are processed in the yaw-zoom correlator 40 under control of the REMEM. signal from the rememorization command circuit 38 and the H. CLOCKS signals (UPDATE CLK. and TRACK CLK.) from the time base generator 34.

As will be described in more detail in connection with FIG. 12, the yaw-zoom correlator 40 provides a YAW output signal to the control surfaces 23 for missile control purposes. The yaw-zoom correlator 40 also provides a No. 3 zoom or ZOOM 3 signal which is averaged in an averaging amplifier 42 with a segment No. 4 zoom or ZOOM 4 signal to control a zoom lens in the optics 24 associated with the camera 14, although other zoom compensation techniques could of course be utilized. In addition, the yaw-zoom correlator 40 provides a segment 3 advance (ADV. 3), segment 3 retard (RET. 3) and segment 3 correlation sample (C.S. 3) signal to the rememorization command circuit 38 which acts, when the error as indicated by the ADV. 3 and RET. 3 signals becomes excessive, to effect rememorization, i.e., the substitution in the segment No. 3 memory circuit 36 of a more current sample of the segment No. 3 data.

With continued reference to FIG. 7, the P.A. VIDEO output signal from the television camera 19 is also applied to vertical area signature detector 44, and to latter device, the time base generator 34 supplies enabling signals ENAB. 1, ENAB. 2 and ENAB. 4 for the three vertical segments illustrated in FIG. 3c, as segments 1, 2 and 4. Additionally supplied from the time base generator 34 to the vertical area signature detector 44 are a vertical integrator clearing signal CLEAR and three sample signals denominated SAMPLE 1, SAMPLE 2 and SAMPLE 4. As will be explained in more detail in connection with FIG. 5a, the vertical area signature detector 44 supplies DATA 1, DATA 2 and DATA 3 signals, respectively, to the three vertical segment memory circuits 46, 48 and 50 of FIG. 7. One of these is hereinafter described in more detail in connection with FIG. 11.

Each of the memory circuits 46, 48 and 50 receives vertical clock (V. CLOCK) and vertical gate delayed (V. GATE DLY.) signals from the time gase generator 34 and the REMEM. signal from the rememorization command circuit 38. The memory circuits 46 and 48, as will be later described, each provide as shown in FIG. 7, new data, new data delayed, old data, and old data delayed signals (N.D. 1, N.D.D. 1, O.D. 1 and O.D.D. 1; and N.D. 2, N.D.D. 2, O.D. 2 and O.D.D. 2) to a roll correlator 52, latter being described in greater detail in connection with FIG. 13.

The roll correlator 52 also receives the REMEM. signal from the rememorization command circuit 38 and provides a ROLL output signal to the control surfaces 23 of the missile 20 of FIG. 2. The roll correlator also provides advance, retard and correlation sample signals (ADV. 1, RET. 1, C.S. 1; ADV. 2, RET. 2, and C.S. 2) to the rememorization command circuit 38.

With continued reference to FIG. 7, it will be noted that the segment No. 4 memory circuit 50 provides N.D. 4, N.D.D. 4, O.D. 4 and O.D.D. 4 signals to a pitch-zoom correlator 54, latter also receiving the REMEM. signal from the rememorization command circuit 38. The pitch-zoom correlator 54 may be identical to the yaw-zoom correlator 40 described in detail in connection with FIG. 12 and will not be separately described. The PITCH output signal from correlator 54 is applied to the control surfaces 23 for missile control purposes.

In addition to the PITCH output signal, the pitch-zoom correlator 54 provides a segment No. 4 zoom signal ZOOM 4 which is averaged in averaging amplifier 42 with the ZOOM 3 signal from the yaw-zoom correlator 40 to provide the ZOOM output signal to the optics 24 of the television camera 19. Advance, retard and correlation sample signals ADV. 4, RET. 4 and C.S. 4, respectively, are also provided by correlator 54 to the rememorization circuit 38 so that the stored data may be updated in the event of an excessive pitch error.

As will be explained in connection with FIG. 14, the rememorization command circuit 38 is also responsive to a pilot override by which rememorization may be effected at any time. Such a pilot override may for example involve a switch which enables the pilot to command the tracking function to commence.

In operation, and with reference to FIGS. 2 and 7, the camera 19 within the nose portion of the missile 20 of FIG. 2 provides P.A. VIDEO and VIDEO output signals together with horizontal and vertical blanking signals. The VIDEO signal is fed to a monitor 30 for display with suitable reticle or cross-hairs in a conventional manner, and the P.A. VIDEO signal is applied to the horizontal and vertical area signature detectors 32 and 44. The horizontal and vertical area signature detectors 32 and 44, under the control of the time base generator 34, supply data signals respectively to the horizontal segment memory circuit 36 and to the three vertical segment memory circuits 46, 48 and 50. The portions of the P.A. VIDEO signal from the camera 19 thus passed respectively by the horizontal area signature detector 32 and the vertical area signature detector 44 correspond to the single horizontal segment No. 3 and the three vertical segments Nos. 1, 2 and 4 illustrated in FIG. 3c.

Although we have thus far principally discussed the segment array as illustrated in FIG. 3c, which is the preferred configuration for use with the missile seeker embodiment of our invention, it is to be realized that we are not to be restricted thereto, and in the instance that our invention is to be used for fire control, the segment array as shown in FIG. 3(a) may be preferred, whereas if our invention is to be used for hover position control, for example, the segment array shown in FIG. 3(b) may be preferred.

Yet other configurations may be desired in accordance with specific applications, and it is to be realized that a particular configuration of segments may be created by modifying the outputs of the time base generator so that the relative enable command are positioned within the time period of the sensor scan format to gate out that portion of the sensor field of view corresponding to the desired area segment.

These data signals are passed to associated memory circuits. The segment No. 3 data is processed in the yaw-zoom correlator 40 to generate the YAW signal utilized to control the flight of the missile 20 toward the target 21 of FIG. 2. The center vertical segment No. 4 data is processed in the pitch-zoom correlator 54 to provide the PITCH output signal for missile control, and the data from the two outer vertical segments Nos. 1 and 2 is processed in the roll correlator 52 to provide the ROLL output signal for guidance of the missile 20. Horizontal zoom and vertical zoom signals are also generated, respectively, by the yaw-zoom and pitch-zoom correlators 40 and 54 from the segment Nos. 3 and 4 data. These zoom signals are averaged, as previously mentioned, to provide a ZOOM output signal to the optics 24.

Any excessive error, or a manual override by the pilot, will effect an updating or rememorization of the data stored in the memory circuits 36, 46, 48 and 50. As should be apparent, the system as described above may also be utilized in conjunction with one or more point or area trackers and significantly lowers the acceptable target contrast level. This is accomplished by the appropriate utilization of the filtered P.A. VIDEO analog signal from the horizontal and vertical area signature detectors 32 and 44.

TIME BASE GENERATOR

With particular reference now to FIG. 8 where the time base generator 34 of FIG. 7 is illustrated in greater detail, the H. BK. and V. BK. signals are applied respectively to the input terminals 56 and 58 from the sync circuits 28 of the television camera 19. The H. BK. signal is applied to the trigger input terminal of a monostable or one-shot multivibrator 60, and the output signal from latter device is applied to an output terminal 61 as the V. CLOCK signal, and to the data input terminals of a pair of scalers 62 and 64. The scalers 62 and 64 may be conventional in both circuitry and operation and may comprise, for example, a plurality of serially connected binary elements or flip-flops.

The output signals from the output terminals of selected ones of the binary elements of the scaler 62 are conveniently combined with the horizontal signature gate signal (LINE 136) from the decoder 68 and the output signal from the first binary element of SCALER 94 in decoder 65, where they are decoded to provide the H. CLOCKS signal (i.e., the UPDATE CLK. and TRACK CLK. signals) to the segment No. 3 memory circuit 36 of FIGS. 7 and 10 by way of a collective output terminal 66. The output terminals of the flip-flops of the scaler 64 may be connected in parallel to a like number of input terminals of a decoder matrix 68 where the signals applied thereto may be selectively combined in suitable conventional logic circuits to provide the signals V.X-HAIR and H.X-HAIR on the collective output terminal 70, the LINE 136 and V. GATE DLY. signals respectively on output terminals 72 and 74, and the input signals to the gate processor 76.

The V. BK. signal is applied to the trigger input terminal 58 of a conventional monostable or one-shot multivibrator 78 and the output signal from the true output terminal thereof is applied to an enabling terminal 80 of the scaler 64.

Continuing with the time base generator of FIG. 8, the gate processor 76 also receives a number of the output signals from a second conventional decoder 82, which decoder provides the ENAB. 3 signal to the horizontal area signature detector 32 by way of an output terminal 98. From the signals applied from the decoders 68 and 82, the gate processor 76 generates the SAMPLE 1, SAMPLE 2 and SAMPLE 4 signals applied to the vertical area signature detector 44 of FIGS. 6a and 7 by way of the collective output terminal 86. The gate processor 76 also provides the CLEAR and ENAB 1, ENAB. 2 and ENAB. 4 signals to the vertical area signature detector 44 by way, respectively, of the output terminal 88 and the collective output terminal 90, and the SUM ENAB. signal to the horizontal area signature detector 32 of FIGS. 6b and 7 by way of an output terminal 92.

The decoder 82 may be similar to the decoder 68 and receives, in parallel, the signals from the output terminals of the plurality of serially connected binary elements or flip-flops which comprise a third scaler 94 connected to receive the output signal from a constant frequency oscillator 96, preferably crystal controlled. The output signal from the last binary element in the scaler 94 is applied to the sync circuit 28 of the camera 19 of FIG. 7 by way of an output terminal 84 as the camera clock or C. CLOCK signal.

In operation, the horizontal clock signals UPDATE CLK. and TRACK CLK. are derived from the decoder 65, as previously mentioned. The decoder 68 is also responsive to the H. BK. signals but is periodically reset by the V. BK signal from the camera 19. All of the output signals from the time base generator 34 are utilized for timing purposes and bear the relationship to each illustrated in the timing diagram of FIGS. 9a and 9b. The generation of the various timing signals from the horizontal and vertical blanking signals is within the state of the art and need not be described in detail, with the relationship of these signals being illustrated in FIGS. 9a and 9b.

TIMING

In a preferred embodiment of the invention illustrated in FIG. 7, and with reference to timing figures 9a and 9b, the information is provided on a per field basis in a two-field-per-frame TV system. At a line frequency of 15,750 Hz. or a line time of 63.5 microseconds, the active line time is 52.5 microseconds with the horizontal blanking pulse occupying the remaining 11 microseconds as illustrated in the CLEAR signal of FIG. 9b. For convenience, the CLEAR signal may be the horizontal blanking signal H. BK.

The field frequency of the described embodiment is 60 Hz. which produces a field time of 16.67 milliseconds. With a 1.27 millisecond V. BK. pulse, the active field time is 15.4 milliseconds and contains 242.5 active lines per field.

In the illustration of FIG. 3c, each of the vertical segments (segments 1, 4 and 2) were selected in the disclosed system to encompass 76 percent of the height and 15 percent of the width of the display. Segments 1, 2 and 4 contain 184 horizontal lines are generally indicated in the vertical gate signal V. GATE of FIG. 9a. Thirty lines, lines 106 to 136, encompassing 1.9 milliseconds or 12.5 percent of the display height are utilized as the vertical limits of the horizontal segment No. 3. The horizontal length of segment No. 3 is 88 percent of the display width. As is illustrated more clearly in the timing diagrams of FIGS. 9a and 9b, it has been found convenient to sample the vertical segments 2 microseconds after the right-hand side of the vertical segments 1, 4 and 2 and to enable the tracker clock at line 137, one line below the lower limit of the horizontal segment No. 3. The pitch segment No. 4 and the yaw segment No. 3 are centered with respect to the crosshairs, whereas the two roll segments, segments 1 and 2, are disposed, respectively, 2 to 10 microseconds and 42 to 50 microseconds interiorly of the field of view illustrated in FIG. 3c.

With reference to the vertical timing diagram of FIG. 9a, the LINE 29 and LINE 213 pulses define the V. Gate signal which is delayed 8 lines to produce the V. GATE DLY. signal. The V. GATE DLY. signal in turn enables the V. CLOCK signal utilized to clock the DATA 1, DATA 2 and DATA 4 signals from the vertical signature detector 44 into the segment Nos. 1, 2 and 4 memory circuits 46, 48 and 50, respectively, in FIG. 7. The LINE 106 and LINE 136 define the upper and lower limits, respectively, of the horizontal segment No. 3 and are utilized to generate the SUM ENAB. signal. The LINE 137 signal is utilized to control the TRACK CLK. signal for clocking the DATA 3 signal from the horizontal area signature detector 32 into the Segment 3 memory circuit 36. The 184 pulses of the UPDATE CLK. occur at a frequency of 4.032 Mhz. and are initiated by the LINE 136 signal. The horizontal crosshair signal H.X-HAIR occurs at LINE 121 and is displayed on the monitor illustrated in FIG. 3c.

With reference to the horizontal timing diagram of FIG. 9b, the horizontal blanking signal H. BK. is utilized as the CLEAR signal to control the vertical integrator timing of FIG. 6a. The left and right dimensions of each of the vertical segments 1, 4 and 2 are utilized to define, respectively, the ENAB. 1, ENAB. 4 and ENAB 2 signals followed, after a two microsecond delay, by the SAMPLE 1 ($t_6$), SAMPLE 4 ($t_{16}$), and SAMPLE 2 ($t_{26}$) signals, respectively, as shown in FIG. 9b. It will be noted that the vertical crosshair signal V.X-HAIR is generated at $t_{13}$ at the mid-point of the field for display on the monitor illustrated in FIG. 3c.

HORIZONTAL SIGNATURE DETECTOR

With reference now to the horizontal area signature detector 32 of FIG. 6b, the P.A. VIDEO input signal is applied from the output terminal of the camera 19 of FIG. 7 to the input terminal 100 of a suitable conventional electronic gate circuit 102. The operation of the gate circuit 102 is controlled by the segment No. 3 enabling signal ENAB. 3 applied by way of the terminal 98 from the time base generator 34 of FIG. 8. When enabled, the gate 102 passes the P.A. VIDEO signal from the television camera 19 to one input terminal 104 of a conventional summing amplifier 106 of the horizontal area signature synthesizer 15b. The output terminal 108 of the summing amplifier 106 is connected to the input terminals of suitable and conventional electronic gate circuits 110 and 112.

The operation of the gate circuit 110 is controlled in a conventional manner by the horizontal signature gate (LINE 136) signal applied by way of terminal 72 from the time base generator 34 of FIG. 8. When enabled, the gate circuit 110 applies the output signal from the summing amplifier 106 to the input terminal 114 of a conventional 4-pole Butterworth filter 116. The output signal from the filter 126 is applied from the output terminal 122 to a conventional quantizer 124 and the output signal therefrom is applied as the DATA 3 signal to the segment No. 3 memory circuit 36 of FIGS. 7 and 10 by way of the output terminal 126. The filter 116 and the quantizer 124 are the principal elements of the area signature processor 16b.

As earlier stated, the output signal from the summing amplifier 106 is also applied to the input terminal of the gate circuit 112. The operation of the gate circuit 112 is controlled in a conventional manner by the SUM ENAB. signal applied by way of the input terminal 92 from the time base generator. The gate 112, when enabled by the SUM ENAB. signal, applies the output signal from the summing amplifier 106 through a suitable conventional amplifier 128 to a delay circuit 130.

The delay circuit 130 delays the input signal by one horizontal scan period and includes an oscillator 136 and, connected in series, a modulator 132, a delay circuit 138, a demodulator circuit 140 and an amplifier 142. Each of the components of the delay circuit 130 are conventional both in their circuitry and operation. The input signal to the delay circuit 130 is utilized to modulate the output signal from the oscillator 136. The frequency of the output signal from the oscillator 136 is selected for compatibility with the glass delay line 138 utilized in the preferred embodiment. The modulated output signal is delayed in the glass, demodulated in the demodulator 140 to recover the signal, and applied to the other input terminal 144 of the summing amplifier 106 earlier described.

The delay line 138 is a precision device that exhibits characteristics similar to a piezoelectric crystal in that it can be modulated by an electrical input, and as a result serve as a suitable path for the signal.

The delay function 130 could also be accomplished by taking the video from buffer amplifier 128, performing an A to D conversion in the video, and then clocking this into a solid state shift register bank whose bit length is proportional to the amount of delay desired. The output of the shift register bank is now D to A converted and the resulting analog output applied to terminal 144 of summing amplifier 106.

In operation, the ENAB. 3 signal on the input terminal 98 gates the P.A. VIDEO signal from the television camera 19 through the summing amplifier 106 to the gate circuit 110. The portion of the VIDEO signal thus passed by the gate 102 corresponds to the area of each horizontal line within segment No. 3 appearing in FIG. 3c.

The SUM ENAB. signal on terminal 92 from the time base generator 34 is utilized by gate 112 to gate the output signal from the summing amplifier 106 through the delay circuit 130 to be summed in the summing amplifier 106 with the portion of the P.A. VIDEO signal next gated by the ENAB. 3 signal. The output signal of the summing amplifier 106 is thus the summation of the P.A. VIDEO signals passed by the gate circuit 102 during the 30 lines of segment No. 3. The gate 112 is opened when not processing segment No. 3 to avoid the regenerative accumulation of noise.

The gate circuit 110 is enabled by the horizontal signature gate (LINE 136) signal which corresponds to the lower boundary of the segment No. 3 illustrated in FIG. 3c. Thus, the P.A. VIDEO signal accumulated over the 30 lines of segment No. 3 is gated during the last horizontal line thereof to the filter 116 of the area signature processor. This filtered signal is digitized in the quantizer 124 and applied via terminal 126 to the segment No. 3 memory circuit 36 of FIG. 10 as the DATA 3 signal. The filtered signal may also be used for point tracking.

SEGMENT NO. 3 MEMORY CIRCUIT

With reference to FIG. 10, the UPDATE CLK. and TRACK CLK. signals from the horizontal area signature detector 34 of FIG. 8 are applied by way of the collective input terminal 66 to the input terminals of a two input terminal OR gate 146. The output of gate 146 is then applied to the clock input terminals of an old data (.O.D.) memory circuit 148 and a new data (N.D.) memory circuit 150.

The DATA 3 signal from the terminal 126 of the horizontal area signature detector 32 of FIG. 6b is applied through a conventional digital filter 152 of the segment No. 3 memory to the data input terminal of the N.D. memory circuit 150. When clocked out of the N.D. memory circuit 150, this N.D. 3 signal is applied by way of terminal 154 to the yaw-zoom correlator 40 of FIGS. 7 and by way of terminal 154.

The filtered DATA 3 signal is also applied through a gate 156 and a two input terminal OR gate 158 to the data input terminal of the O.D. memory circuit 148. This data, when clocked out of the O.D. memory circuit 148 by the UPDATE CLK. signal, is recirculated through a conventional gate 160 and the OR gate 158 to the input terminal of the O.D. memory circuit 148. This data is also applied to the yaw-zoom correlator 40 of FIG. 12 by way of terminal 162.

In operation, the DATA 3 signal from the horizontal area signature detector 32 is clocked into the N.D. memory circuit 150 by the burst of pulses in the update clock signal upon the occurrence of the LINE 136 signal, i.e., the end of segment No. 3. This data is then clocked out of the N.D. memory circuit 150 by the TRACK CLK. signal at the line rate to provide the N.D. 3 output signal on terminal 154. The N.D. 3 signal is also delayed in a conventional digital delay circuit 164 to provide on terminal 166 the new data delayed (N.D.D.3) signal to the yaw-zoom correlator 40 of FIG. 12.

The DATA 3 signal is also clocked into the O.D. memory circuit 148 by the UPDATE CLK. signal when a REMEM. signal is received on terminal 168 from the rememorization command circuit 38 of FIGS. 7 and 14. The data in the O.D. memory circuit 148 is thereafter available on terminal 162, when clocked by the TRACK CLK. signal, as the O.D. 3 signal. In addition, the O.D. 3 signal is delayed in a conventional delay circuit 170 and applied as O.D.D. 3 to the yaw-zoom correlator 40 of FIG. 12 by way of teminal 172. The recirculation of old data through the gate 160 can be interrupted by the REMEM. singal, which simultanously passes new data into the O.D. memory circuit to update the O.D. 3 signal, which of course results in the updating of the O.D.D. 3 signal.

YAW-ZOOM CORRELATOR

With reference now to FIG. 12, wherein the yaw-zoom correlator 40 is illustrated in greater detail, the new and old data signals N.D. 3, O.D.D. 3, O.D. 3 and N.D.D. 3 are applied respectively to the input terminals 154, 172, 162 and 166 from the segment 3 memory circuit 36 of FIG. 10 just discussed. The N.D. 3 and O.D.D. 3 signals are applied to the input terminals of a two input terminal AND gate 174. The output signal from the AND gate 174 is applied to one input terminal of a two terminal AND gate 182, is applied as a positive input signal to a summation circuit 176, and is applied by way of terminal 178 to the rememorizating command circuit 38 of FIG. 14 as the RET. 3 signal. Similarly, the O.D. 3 and the N.D.D. 3 are applied to the input terminals of a two input terminal AND gate 180 and the output signal therefrom applied to the other input terminal of the AND gate 182 is applied to a negative input terminal of the summation circuit 176, and applied by way of terminal 184 to the rememorizating command circuit 38 of FIG. 14 as the ADV. 3 signal.

The output signal from the summation circuit 176 of FIG. 12 is applied through an a.c. coupling capacitor 186 to a d.c. restorer 188. The output signal from the d.c. restorer 188 is applied to the input terminal 190 of a conventional amplifier 192. The output signal from the amplifier 192 is fed back from the output terminal 194 thereof to the input terminal 190 by way of a capacitor 196. The amplifier 192 functions as an integrator unless the conventional electronic gate 198 connected between terminals 194 and 190 is activated by a REMEM. signal applied to terminal 168. Terminal 194 is connected by way of terminal 200 to the control surfaces 45 of FIG. 7 as the YAW signal, and this latter signal is also applied through a conventional amplifier 202 in the yaw-zoom correlator to a negative input terminal of a summation circuit 204.

The output signal from the summation circuit 176 earlier described is also applied through a conventional operational amplifier 206 and an a.c. coupling capacitor 208 to a d.c. restorer 210 of the yaw-zoom correlator, which may be similar in every respect to the d.c. restorer 188 earlier described. The output signal from the d.c. restorer 210 is applied to the input terminal 212 of a conventional amplifier 214 whose output terminal 216 is connected back to the input terminal 212 thereof through a capacitor 218, and through a conventional electronic gate circuit 220. The output signal from the amplifier 214 is applied by way of an output terminal 222 to the amplifier 42 of FIG. 7 as the ZOOM 3 signal. The amplifier 214 functions as an integrator unless the gate 220 connected between terminals 216 and 212 is activated by a REMEM. signal applied to terminal 168.

In addition, the output signal from the amplifier 214 is applied through a conventional operational amplifier 224 whose gain is varied as a function of time, as illustrated in FIG. 12a. The output of amplifier 224 is applied to a negative input terminal of the summation circuit 204. The output from terminal 194 is connected to the input of operational amplifier 202, and its output is connected to a negative input terminal of summation circuit 204. The output signal from the summation circuit 204 is applied through a conventional electronic gate circuit 226 and an amplifer 228 to a negative input terminal of the summation circuit 176, earlier described.

Returning to the AND gate 182, the output of this gate is applied to the trigger input terminal of a conventional monostable or one shot multivibrator 230. The output signal taken from the true output terminal thereof is applied as the control signal to the gate 226. is applied to the two d.c. restorer circuits 188 and 210, and is applied as C.S. 3 to the rememorization command circuit 38 of FIG. 14 by way of an output terminal 232.

The REMEM signal from the output terminal 168 of the rememorization command circuit 38 of FIG. 14 is applied to the control input terminals of the gates 198 and 220 of FIG. 12, as will be discussed hereinafter.

In operation, the pulses of the new data and old data delayed signals are compared in the AND gate 174 and the error output signal therefrom is a fixed amplitude pulse modulated in width, which width is a function of the degree of coincidence between the pulses of the N.D. 3 and O.D.D. 3 signals. This pulse width modulated error signal is used as the retard or RET. 3 control signal, and appears on terminal 178. Similarly, the O.D. 3 and N.D.D. 3 signals are combined in the AND gate 180 and the pulse width modulated output signal therefrom, which is applied to terminal 184, is utilized as the advance signal ADV. 3 for control purposes.

The coincidence of the RET. 3 and ADV. 3 signals as detected by the AND gate 182 of the yaw-zoom correlator will trigger the multivibrator 230 to produce the correlation sample output signal C.S. 3 on terminal 232. The difference between the RET. 3 and ADV. 3 signals is derived in the summing circuit 176, and is integrated in the amplifier 192 to provide the YAW control signal. The YAW control signal, which appears in terminal 200, is a d.c. signal having an amplitude and polarity dependent upon the relative width of the error pulses RET. 3 and ADV. 3 applied to the summing circuit 176.

The output of the summing circuit 176 is amplified in the amplifier 206 and integrated in the amplifier 214 to provide on terminal 222 the d.c. ZOOM 3 output signal utilized for control purposes. The gain of the amplifier 206 is varied as a function of time, as indicated in FIG. 12a, to introduce a selective weighting in the zoom control signal as a function of the time position of the difference error pulses emanating from summing circuit 176. The YAW output signal and the ZOOM 3 output signal are each fed back through amplifiers 202 and 224, respectively, in order to provide the necessary and properly weighted feedback which enables the yaw-zoom correlator to achieve a closed form solution for the YAW and ZOOM 3 component errors which have contributed to the misalignment between the old data and the new data information streams. The gain of the amplifier 224 is also varied in the manner of the amplifier 206 and as illustrated in FIG. 12a, so that the ZOOM 3 output can be properly scaled in accordance with the effects of zoom as range closure of the missile 20 with respect to the target 21 takes place. The output of summation circuit 204 is passed through the gate 226 and fed back to the summing circuit 176 as a fixed width, variable amplitude pulse signal to serve as the feedback sample for the closed form solution mentioned above. The process performed by the yaw-zoom correlator represents a derivative algorithm of the mathematical concept of least squares estimation, and as a result, the YAW output signal represents a least squares fit estimate of the true yaw error. For further discussion of the concepts contained within this type of error processor, reference should be made to the J. R. Bogard et al. U.S. Pat. No. 3,372,890.

The output signal from the multivibrator 230 utilized to control the gate 226 in the feedback loop and also to effect the proper operation of the d.c. restorers 188 and 210 is in accordance with conventional practice.

VERTICAL SIGNATURE DETECTOR

With reference now to FIG. 6a, the vertical area signature detector differs from the horizontal area signature detector 32 of FIG. 6b primarily in the absence of the delay function in the feedback loop. The vertical signature detector is a serial processor which integrates the gated video, and upon completion of the integration process, performs a sample and hold operation thereon. On the other hand, the horizontal signature detector utilizes a delay function not present in the vertical signature detector, which delay function serves to delay the accumulated sum of the gated video from scan line within the portion of the sensor field of view defined as the horizontal segment of FIG. 3a.

In more detail, the P.A. VIDEO input signal to the terminal 100 from the television camera 19 of FIG. 7 is applied to a conventional electronic gate circuit 234 of the vertical area signature detector, and the output therefrom is fed to the input terminal 236 of a conventional operational amplifier 238. The output terminal 240 of the amplifier 238 is connected to the input terminal 236 through a capacitor 242, so that the amplifier 238 functions as an integrator unless the conventional electronic gate 244 connected between terminals 236 and 240 is activated by a CLEAR signal. The output signal from the amplifier 238 is sampled and held by a sample and hold circuit 246 and the output therefrom appearing on terminal 247 is filtered and quantized to produce the DATA 1 output signal applied to the terminal 248 of the segment 1 memory circuit 46 of FIGS. 7 and 11. As will be recalled, the appearance of the waveforms at terminals 247 and 248 was set forth and discussed in conjunction with FIG. 4a.

The operation of the gate 234 is controlled by the ENAB. 1 signal as supplied from terminal 90 of the time base generator 34 of FIG. 8. Similarly, the electronic gate 244 is controlled by the CLEAR output signal derived from the output terminal 88 of the time base generator, and the operation of the sample and hold circuit 246 is controlled by the SAMPLE 1 output signal from terminal 86 of the device 34.

In operation, the P.A. VIDEO signal is continuously applied to the input terminal of the gate 234 and a portion of each line gated therethrough by the ENAB. 1 signal. This portion is integrated by the amplifier 238 and sampled at an appropriate time by the SAMPLE 1 signal. The sampled value is dependent upon the contrast at that point and a plurality of samples is filtered in the filter 250 to produce a low frequency contour which is then quantized to produce the digital DATA 1 output signal appearing on the terminal 248 and illustrated in FIG. 4a.

SEGMENT 1 MEMORY

With reference now to FIG. 11 wherein the segment 1 memory circuit 46 of FIG. 7 is illustrated in greater detail, the DATA 1 output signal from terminal 248 of the vertical signature detector 44 of FIG. 6a is applied through a digital filter 258 to an output terminal 260 as the new data or N.D. 1 output signal. This N.D. 1 signal is also delayed in a conventional digital delay circuit 262 and applied to output terminal 264 the delayed new data or N.D.D. 1 signal.

The output signal from the digital filter 258 is also applied through a conventional electronic gate 266 to one input terminal of a two input terminal OR gate 268. The output signal from the OR gate 268 is applied to the data input terminal of a conventional old data memory circuit 270 and the output signal therefrom applied to an output terminal 272 as the old data or O.D. 1 output signal. This O.D. 1 output signal is delayed in a conventional delay circuit 274 and applied to an output terminal 276 as the delayed old data or O.D.D. 1 output signal. The O.D. 1 output signal is also fed back through a conventional electronic gate circuit 278 to the other input terminal of the OR gate 268. The operation of both of the gates 266 and 278 is controlled by the REMEM signal to terminal 168 from the rememorization command circuit 38 of FIGS. 7 and 14.

The V. GATE DLY. and the V. CLOCK signals applied respectively to the terminals 74 and 61 from the time base generator 34 are applied through a NAND gate 280 to the clock input terminal of the old data memory circuit 270.

In operation, the DATA 1 signal is filtered to produce the N.D. 1 signal. This signal is also delayed to produce the N.D.D. 1 signal and is also gated initially through the gate 266 and OR gate 268 to the memory circuit 270. The DATA 1 signal is clocked into the old data memory circuit by the output signal from the NAND gate 280. As clocked out of the old data memory circuit 270, this data is the O.D. 1 output signal and is recirculated through the gate 278 and the OR gate 268 for reinsertion into the memory circuit 270. The application of the REMEM signal interrupts the recirculation of the old data through the gate 278 and opens the gate 266 to permit the current DATA 1 input signal to pass into the old data memory circuit 270. The O.D. 1 signal is also delayed in the delay circuit 274 to produce the O.D.D. 1 output signal.

ROLL CORRELATOR

With reference to FIG. 13 wherein the roll correlator 52 of FIG. 7 is illustrated in greater detail, the N.D. 1 and O.D.D. 1 are applied, respectively, to the terminals 260 and 276 from the segment No. 1 memory circuit of FIG. 11, which terminals connect to the two input terminals of AND gate 282. The output signal from the AND gate 282 is applied to the rememorization command circuit 38 of FIG. 14 by way of output terminal 284 as the RET. 1 signal. This RET. 1 signal is also positively applied to a conventional summing circuit 286 and to one input terminal of a two input terminal AND gate 288. Similarly, the O.D. 1 and N.D.D. 1 signals are applied, respectively, from the terminals 272 and 264 of the segment No. 1 memory circuit 46 of FIG. 11 to the input terminals of a two input terminal AND gate 290. The output signal from the AND gate 290 is applied to the rememorization command circuit 38 of FIG. 14 by way of an output terminal 292 as the ADV. 1 signal. This ADV. 1 signal is also applied negatively to the summing circuit 286 and also to the other input terminal of the AND gate 288.

The output signal from the summing circuit 286 is supplied through an a.c. coupling capacitor 294 and a d.c. restorer circuit 296 to the input terminal 298 of a conventional operational amplifier 300. The output terminal 302 of the amplifier 300 is connected to the input terminal 298 thereof by way of a capacitor 304 and a conventional electronic gate circuit 306. This amplifier functions as an integrator unless the gate 306 is activated by the REMEM. signal from the rememorization command circuit 38 of FIG. 14, applied by way of the terminal 168.

The output of the amplifier 300 of FIG. 13 is applied to the positive input terminal of a conventional differential amplifier 308 whose output signal is applied to the control surfaces 45 of FIG. 7 as the ROLL signal by way of a terminal 310. The output signal from the amplifier 300 is also applied through a conventional amplifier 312 and an electronic gate 314 negatively to the summing circuit 286.

The output signal from the AND gate 288 is applied to the trigger input terminal of a monostable or one-shot multivibrator 316 and the output signal taken from the output terminal is applied to the rememorization command circuit of FIG. 14 via an output terminal 318 as the C.S. 1 signal. The output signal from the multivibrator 316 of FIG. 13 is also utilized to control the operation of the d.c. restorer 296 and the gate circuit 314.

The circuit for the segment No. 2 data at the right-hand side of the display 31 of FIG. 3c is similar to that described above for the left-hand segment No. 1 of the display. The O.D. 2 and N.D.D. 2 signals to the roll correlator 52 are supplied respectively to the terminals 320 and 322, these signals being obtained from the segment No. 2 memory circuit 48 of FIG. 7. These signals are applied to the input terminals of AND gate 324, and the output signal from the AND gate 324 is applied to the rememorization command circuit by way of an output terminal 326 as the RET. 2 signal. The output signal is also applied negatively to a summing junction 328, and is also applied to an input terminal of the two input terminal AND gate 330.

Similarly, the N.D. 2 and O.D. 2 signals to the terminals 332 and 334 from the segment No. 2 memory circuit 48 of FIG. 7 are applied to the input terminals of a two input terminal AND gate 336 of the roll correlator. The output signal from the AND gate 336 is applied by way of an output terminal 338 to the rememorization command circuit 38 of FIG. 14 as the ADV. 2 signal. This ADV. 2 signal is also negatively applied to the summing junction 328 of FIG. 13 and to the other input terminal of the AND gate 330.

The output signal from the summing circuit 328 is applied through an a.c. coupling capacitor 340 and a d.c. restorer circuit 342 to input terminal 344 of a conventional operational amplifier 346 whose output terminal 348 is connected by way of a capacitor 350 and an electronic gate circuit 352 in parallel, to the input terminal 344 thereof. The amplifier 346 functions as an integrator unless the conventional gate 352 is activated by a REMEM signal applied to terminal 168. The output signal from the amplifier 346 is also applied to a negative input terminal of the differential amplifier 308 and, in addition, is fed through an amplifier 354 and an electronic gate 356 positively to the summing junction 328. The output signal from the AND gate 330 is applied to the trigger input terminal of a conventional monostable or one-shot multivibrator 358. The output signal from the output terminal of the multivibrator 358 is supplied to the rememorization command circuit 38 of FIG. 14 by way of an output terminal 360 as the C.S. 2 signal, and is also utilized to control the operation of the gate circuit 356 and the d.c. restorer 342.

In operation, the segment No. 1 data, N.D. 1, O.D.D. 1, O.D. 1 and N.D.D. 1 signals are combined in the AND gates 282 and 290 to provide the pulse width modulated signals RET. 1 and ADV. 1 for the rememorization command circuit. Coincidence of these signals is also utilized to trigger the multivibrator 316 to operate the DC restorer circuit 296 and the gate circuit 314. The difference between the RET. 1 and ADV. 1 pulses is integrated in the amplifier 300 and applied to the differential amplifier 308. In a similar manner, the O.D. 2, N.D.D. 2, N.D. 2 and O.D.D. 2 signals are selectively combined in the AND gates 324 and 336 and the difference therebetween integrated in the amplifier 346 and applied to the differential amplifier 308. The difference between the error signals from the right and left-hand segments Nos. 1 and 2 of the display 31 illustrated in FIG. 3c. is supplied as the ROLL control signal to the control surfaces of the system shown and described in conjunction with FIG. 7.

As was earlier explained in connection with the yaw-zoom correlator 40 of FIG. 12 and the segment No. 3, the coincidence of the pulse width modulated error signals RET. 1 and ADV. 1 is utilized in the roll correlator to trigger a multivibrator 316 to control the operation of the d.c. restorer 296 and gate circuit 314, and also to provide the C.S. 1 output signal on terminal 318. Similarly, the coincidence of the RET. 2 and ADV. 2 signals is utilized in the roll correlator to trigger the multivibrator 358 to control the operation of the D.C. restorer 342 and the gate circuit 356, and to provide the C.S. 2 output signal on terminal 360. The segment No. 1 signals RET. 1, ADV. 1 and C.S. 1, and the segment No. 2 signals RET. 2, ADV. 2 and C.S. 2 are applied to the rememorization command circuit 38 of FIG. 14, as were the segment No. 3 signals RET. 3, ADV. 3 and C.S. 3 from the yaw-zoom correlator 40 of FIG. 12. The result of this processing is a closed loop least squares fit estimation of the roll error.

PITCH-ZOOM CORRELATOR

The pitch-zoom correlator 54 of FIG. 7 may be identical to the yaw-zoom correlator 40 described in connection with FIG. 12. The REMEM. signal from terminal 168 of the rememorization command circuit of FIG. 14 as well as the four data signals N.D. 4, N.D.D. 4, O.D. 4 and O.D.D. 4 are received in the pitch-zoom correlator 54 from the segment 4 memory circuit 50, and processed to provide the PITCH output signal to the control surfaces 45 of FIG. 7; the ZOOM 4 signal for combination with the ZOOM 3 signal in the amplifier 42 of FIG. 7; and the ADV. 4, RET. 4 and C.S. 4 signals applied respectively to the input terminals 380, 382 and 384 of the rememorization command circuit 38 of FIG. 14.

REMEMORIZATION COMMAND CIRCUIT

With reference to FIG. 14 wherein the rememorization command circuit 38 of FIG. 7 is illustrated in greater detail, the advance, retard and correlation sample signals from the memory circuits associated with each of the four segments illustrated in the display 31 of FIG. 3c are applied respectively to one of the four channels 361, 362, 364 or 366. With particular reference to the channel 361, which is shown in detail in FIG. 14, the ADV. 1 and RET. 1 signals applied respectively from the terminals 292 and 284 of the roll correlator 52 of FIG. 13 are applied to the input terminals of a two input terminal OR gate 368. The output signal from the OR gate 366 is applied through a resistor 370 to a conventional sample and hold circuit 372 to which the correlation sample signal C.S. 1 is applied as a control signal from the output terminal 318 of the roll correlator 52 of FIG. 13. The output signal from the sample and hold circuit 372 is applied to one input terminal of a conventional threshold detector 374.

The threshold detector 374 may be conventional both in its circuitry and operation and comprise, by way of example, an amplifier to which a reference voltage may be applied for comparison with the sampled signal. The output signal of the threshold detector 374 is applied to one input terminal of a five input terminal OR gate 376 and the output signal therefrom is utilized as the REMEM. signal. The REMEN. output signal is applied by way of an output terminal 168 to the various segment memory circuits 36, 46, 48 and 50, and to the correlators 40, 52 and 54, as illustrated in FIG. 7. The REMEM. signal is also applied internally within the rememorization command circuit 38 to each of the four channels 361, 362, 364 and 366 of FIG. 14, where it is applied as a control circuit to the sample and hold circuits contained therein.

In addition, a pilot override circuit 378 may be manually actuated to provide an input signal to the OR gate 376.

The advance, retard and correlation sample signals from the memory circuits 48, 36 and 50, associated respectively with the segments 2, 3, and 4, and each of the channels 362, 364, and 366 provide an input signal to the OR gate 376, as shown in FIG. 14.

In operation, both advance and retard signals will be passed through the OR gate at the input of each of the channels 361, 362, 364 and 366, and sampled on command by the correlation sample signal from the associated memory circuit. If the sampled value exceeds the reference voltage of the threshold detector in that particular channel, a signal will be passed through the OR gate 376 to internally reset the sample and hold circuits of each of the channels 361, 362, 364 and 366, as well as the memory circuits 36, 46, 48 and 50, and the correlators 40, 52 and 54.

MATHEMATICAL BASIS

Before proceeding into additional uses or embodiments of our invention, it is appropriate to discuss the vertical and horizontal area signature detection process on a mathematical basis. Consider the case where the sensor is a television camera operating with a conventional scan format arrangement.

Functionally, the vertical area signature can be described by the following equations:

$$V_v(i\Delta T_v) = \int_{T_i - \frac{\Delta T}{2}}^{T_i + \frac{\Delta T}{2}} V_l(t)Dt \text{ where } i = 1,2, \ldots N_1 \quad (1a)$$

$$V_v(i\Delta T_v) = 0 \text{ where } i = N_1 + 1, \ldots N_2 \quad (1b)$$

where $i = 1$ corresponds to the top of the vertical segment, $T_i$ denotes the scan time equivalent to the midpoint of the $i^{th}$ scan line, $\Delta T$ denotes the time width of the vertical segment, $N_1$ is equal to the number of scan lines processed within the vertical segment, $N_2$ equals the number of scan lines per field, and $V_l(t)$ represents the instantaneous video level for the $l^{th}$ scan line. The output of the finite time integrator is sampled and held every line to generate the vertical signature.

Similarly, the horizontal area signature can be defined in terms of the following equations:

$$V_H(i\Delta T_H) = 0 \text{ where } i = 1, 2, \ldots N_3 \quad (2a)$$

$$V_H(i\Delta T_H) = \sum_{j=1}^{N_3} V_l[(i - N_3)\Delta T_{HS}] \quad (2b)$$
$$\text{where } i = N_3 + 1, \ldots N_3 + N_4$$

where $i = 1$ corresponds to the top of the horizontal segment. Equation 2 can be best understood by assuming that the horizontal segment has been partitioned into $N_4$ vertical intervals comprised of $N_3$ raster lines each where $V_j[(k)\Delta T_{HS}]$ is the sampled value of the sensor video corresponding to the $k^{th}$ interval of the $j^{th}$ raster line. Since the signature is periodic with period $T_S, \Delta T_H = T_S/(N_3 + N_4)$ and $\Delta T_{HS} = T_L/N_4$ where $T_L$ is the active line time of the sensor.

It should be noted that these equations describe the general segment arrangement shown in FIG. 3(a). However, by suitable subscript definition, this teaching could be extended to describe configurations 3(b) and 3(c) or by analogy a set of equations could be defined for a circular or polar scan format.

INTRUSION DETECTION SYSTEM

Turning now to FIG. 15, it will there be seen that we have presented an embodiment of this invention in the form of an intrusion detection system. It should be noted that FIG. 15 represents a modification of the device in accordance with FIG. 7, principally differing in the segments required for intrusion detection. Portions in FIG. 15 identical to those in FIG. 7 will not again be described.

The device of FIG. 15 requires processing means for detecting the intrusion signal, and to this end we utilize in this device, the vertical area signature detector 44 described in conjunction with FIG. 7, with the outputs therefrom being connected (as before) to SEG 1 memory 46 and SEG 2 memory 48. The outputs from these are such that device 46 supplies old data No. 1 and new data No. 1 to exclusive OR 450, and the device 48 supplies old data No. 2 and new data No. 2 to exclusive OR 452. The old data is compared to the new data from each field of a memorized scene, and differences are detected by the use of the exclusive OR devices. The output of exclusive OR 450 is filtered in digital filter 454, and the output of exclusive OR 452 is filtered in digital filter 456, with the output signals from the filters being combined in an additional OR circuit 458.

The output from latter device, known as the Intrusion Signal Enable, is connected by lead 460 to devices such that audio and/or visual alarms can be activated. For example, the lead 460 can connect to alarm 462 which may involve one or more bells or lights. The Intrusion Signal Enable is also utilized to activate a video gate 464 that will supply the camera video to a video tape recorder 466, and to supply the camera video to a monitor 476. A video selector 474 may be used in conjunction with a multiple camera system, which can automatically select video from a camera system in which an intrusion has been detected. The automatic rememorization circuits of FIG. 7 have been replaced with a manual rememorization 468, which is operator controlled from the Control Console 470. The operator may also control the camera field of view with his manual zoom 472 control located on the Control Console 470.

In operation, the operator may initiate memorization of the scene signature by operation of the Manual Remem 468, which scene may for example be an empty hallway in a building. This scene is stored by the area signature detection system in the segment memories.

If an intrusion or difference occurs in one of the segments (caused by the entrance or exit of one or more persons, for example), an error signal is generated between the memorized data, old data, and the new data. This difference is detected in the exclusive OR circuits (450 or 452) and generates the alarm signal on lead 460, thus warning the operator that someone has entered the premises.

It should be noted that this intrusion detection system is not limited to use singly, but may be utilized with multiple camera systems such as would be involved in warehouses or closed public buildings. In this embodiment many cameras may be automatically monitored, and only if an intrusion occurs in any of the areas moitored will an alarm be generated and the video from that camera selected by device 474 and displayed at a central control point, thus enabling one operator to monitor many remote locations.

Obviously, we could, if preferred, use the horizontal signature detection means of FIG. 7 and process in a like manner to that described above in conjunction with the vertical signature detection means, in order to obtain the Intrusion Signature Enable 460.

It will now be apparent that we have provided a highly effective area signature detection system, characterized by the fact that we generate analog area signatures, which is in distinct contrast with the prior art teachings generating signatures on a point-to-point basis in a digital format. Such prior art arrangements of course require large memories and wide bandwidths.

All of the embodiments of this invention set forth herein utilize at least one area signature detector means, with the missile tracking embodiment utilizing a pair of area signature detectors. The signature detector or detectors of each embodiment of course have suitable input means so that input signals can be received.

Gating means for selecting portions of the input signal, area signature synthesizer means, and area signature processor means are utilized in each area signature detector, with time base generator means being operatively associated with the area signature detector so that the input signal can be synchronized with the gating means. Suitable memory means are also provided in connection with each embodiment for storing at least one reference signature.

Processing means may be connected to receive the output from the various memories utilized, with such being used to compare a stored reference signature with a new signature obtained by operation of the detector means. These processing means in each instance have a suitable output for providing an error signal such as a command to an aircraft, or in the form of an intrusion signal.

The signature detector means may further include means for gating portions of such input signal, integrating such gated input signal, and performing a sample and hold upon the results of such integration in order to form a low frequency content area signature. The input signal can involve multiple lines that are sampled and held, and such multiple lines can originate from a polar scanned system or from a cartesian coordinate scanning system, as will of course be apparent to one skilled in the art. Alternatively, the signature detector means may have means for gating portions of the input signal, and for summing such gated input signal to form a composite high frequency content area signature.

Thus, in contrast with the teachings of the prior art, the present invention develops area signature signals in accordance with two different novel approaches. The horizontal signature detector scans the sum of a number of electronically generated lines to produce a signature representative of the area covered horizontally within a system field of view, as depicted by Segment No. 3 of FIG. 3c. The vertical signature detector usable either separately or together with the horizontal signature detector scans a horizontal segment vertically within the field of view to produce a vertical signature of the included area, as depicted by segments Nos. 1, 2 and 4 of FIG. 3c. All of the foregoing signatures contain the data required for use in missile guidance, target tracking or intrusion detection systems without the need of wide bandwidth and high signal levels. In addition, these techniques minimize the memory required to generate the error signals for use in the above-mentioned systems, whereas the prior art, due to the wide bandwidths required, needed significantly larger memories associated with each of the above-mentioned types of devices.

As described above in the context of a missile guidance system, the correlation method and apparatus of the present invention eliminates the need for multiple gimbal sensors and the elimination of boresight errors common in prior art guidance systems of this general type. As previously mentioned, the present invention is compatible with laser sensitive sensors, low light level sensors, FLIR (forward-locking infra-red) systems, line scanning systems, or in daylight with any number of standard television vidicons. The apparatus is small in size, utilizes all solid state components, and will accept roll angle inputs in excess of plus or minus 10° in the production of pitch and yaw error signals. One of the major advantages of the present invention is the utilization of a single sensor to provide a visual display of the area tract as well as the digital signals for correlation tracking.

The compatibility of the present invention with other TV trackers makes possible the combination of area tracking and moving target tracking systems, and it should be noted that the use of the filtered data as the input to the moving target trackers lowers the acceptable target contrast level and facilitates anticipation of target position when the target is temporarily obscured.

The utilization of two point trackers permits centering of the optics by the processing of the pre-amp video signals. Once the desired contrast point is centered, the processed video from the horizontal and vertical signature detectors may be substituted to provide a highly sensitive, small area tracker.

This invention may be embodied in other specific forms without departing from the spirit or essential characteristics thereof. The presently disclosed embodiments are, therefore, to be considered in all respects as illustrative and not restrictive, the scope of the invention being indicated by the appended claims rather than by the foregoing decription, and all changes which come within the meaning and range of equivalency of the claims are, therefore, intended to be embraced therein.

In addition to being usable in conjunction with missile tracking, intrusion detecting, platform stabilizing and the like, our novel system also has utility in seeking areas of minimum contrast, such as would be desirable in seeking smooth landing areas for interplanetary vehicles.

The television camera may, as earlier mentioned, be replaced by any suitable scanning means for generating an electronic signature, these including an electronic line scanner and certain radar devices.

We claim:

1. A method of modifying the flight path of a missile comprising the steps of:
    (a) scanning a field of view from the missile with a line scan sensor to produce a line scan signal representing sensed variations in scene content along each scan line of the field of view;
    (b) generating, in response to the line scan signal, a first electronic signature characterizing area variations within selected segments of a field of view from the missile;
    (c) generating, in response to the line scan signal, a second electronic signature characterizing area variations within corresponding selected segments of the field of view from the missile, the second electronic signature characterizing area variations in the field of view at a time subsequent to the variations characterizing by the first electronic signature;
    (d) correlating the first electronic signature with the second electronic signature to generate a control signal related to the degree of correlation between the area variations within the selected segments of the first electronic signature and the area variations with the corresponding segments of the second electronic signature; and
    (e) controlling the flight path of the missile in response to the control signal.

2. The method of claim 1 wherein the first electronic signature is generated by:
    gating the line scan signal to select predetermined segments of the line scan signal corresponding to the selected segments of the field of view characterized by the first electronic signature; and,
    combining the selected segments of the line scan signal to produce the first electronic signature.

3. The method of claim 1 wherein the field of view is repetitively scanned by the line scan sensor along the same scan lines and wherein the first and second electronic signatures are generated by:
    repetitively gating the line scan signal to repetitively select predetermined segments of the line scan signal corresponding to the selected segments of the field of view characterized by the first and second electronic signatures;
    generating the first electronic signature in response to the gated line scan signal;
    storing the first electronic signature; and
    generating the second electronic signature in response to the gated line scan signal subsequent to generating the first electronic signature.

4. The method of claim 1 wherein the selected segments are based upon a Cartesian coordinate system and the selected segments are vertical and horizontal segments of the electronic signature.

5. The method of claim 1 wherein the selected segments are based upon a polar coordinate system and the selected segments are circular segments of the electronic signature.

6. The method of claim 1 including the additional step of storing the first electronic signature, the second electronic signature being correlated with the stored first electronic signature.

7. The method of claim 6 wherein the electronic signatures characterize area radiance variations within the field of view.

8. The method of claim 7 wherein the selected segments are based upon a Cartesian coordinate system and the selected segments are vertical and horizontal segments of the electronic signature.

9. The method of claim 7 wherein the selected segments are based upon a polar coordinate system and the selected segments are circular segments of the electronic signature.

10. A method of modifying the flight path of a missile comprising the steps of:
   (a) scanning a field of view from the missile with a line scan sensor to generate a line scan signal representing sensed variations in scene content along scan lines of the field of view from the missile;
   (b) generating, in response to the line scan signal, a first electronic signature characterizing area variations within selected, related segments of the field of view at a first time;
   (c) storing the first electronic signature;
   (d) generating, in response to the line scan signal, a second electronic signature characterizing area variations within corresponding selected, related segments of the field of view at a second time subsequent to the first time;
   (e) correlating the stored first electronic signature with the second electronic signature to generate a control signal related in value to the degree of correlation between the stored first electronic signature and the second electronic signature;
   (f) modifying the flight path of the missile in response to the control signal.

11. The method of claim 6 including the additional step of updating the stored reference electronic signature responsively to the magnitude of the control signal.

12. The method of claim 1 wherein the correlation of the first electronic signature with the second electronic signature comprises the steps of:
   (a) converting the electronic signatures into digital form;
   (b) delaying the digital electronic signatures;
   (c) detecting the degree of coincidence between pulses in the first electronic signature and delayed pulses in the second electronic signature to provide a first coincidence output signal while simultaneously detecting the degree of coincidence between pulses in the second electronic signature and delayed pulses in the first electronic signature to provide a second coincidence output signal;
   (d) generating a coincidence difference signal in response to the first and second coincidence output signals; and,
   (e) integrating the coincidence difference signal to provide said control signal.

13. The method of claim 12 including the additional step of selectively algebraically summing said control signal with the concidence difference signal responsively to the first and second coincidence output signals.

14. The method of claim 12 including the step of varying the amplification of the control signal and said coincidence difference signal as a function of time.

* * * * *